(12) United States Patent
Jang et al.

(10) Patent No.: US 11,457,219 B2
(45) Date of Patent: *Sep. 27, 2022

(54) IMAGE CODING/DECODING METHOD AND APPARATUS THEREFOR

(71) Applicant: Taissa Research LLC, Chicago, IL (US)

(72) Inventors: Hyeongmoon Jang, Seoul (KR); Jaehyun Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/187,517

(22) Filed: Feb. 26, 2021

(65) Prior Publication Data

US 2021/0203940 A1 Jul. 1, 2021

Related U.S. Application Data

(63) Continuation of application No. 16/330,329, filed as application No. PCT/KR2017/009705 on Sep. 5, 2017, now Pat. No. 10,979,714.

(Continued)

(51) Int. Cl.
*H04N 19/132* (2014.01)
*H04N 19/176* (2014.01)
(Continued)

(52) U.S. Cl.
CPC ........... *H04N 19/132* (2014.11); *H04N 19/11* (2014.11); *H04N 19/117* (2014.11);
(Continued)

(58) Field of Classification Search
CPC .............................. H04N 19/11; H04N 19/117
(Continued)

(56) References Cited

U.S. PATENT DOCUMENTS

2012/0320974 A1  12/2012  Li ........................ H04N 19/593
                                                    375/240.12
2013/0114708 A1   5/2013  Van der Auwera et al.
(Continued)

FOREIGN PATENT DOCUMENTS

CN      103621079 A    3/2014
CN      104662902 A    5/2015
(Continued)

OTHER PUBLICATIONS

XP030049344: Lee, J. et al., Joint Collaborative Team on Video Coding (JCT-VC) of ITU-T SG16 WP3 and ISO/IEC JTC1/SC29/WG11, 6th Meeting Torino, Italy, Jul. 18-22, 2011, "Mode Dependent Filtering for Intra Predicted Sample," ETRI (8 pages).

(Continued)

*Primary Examiner* — Kiet M Doan
(74) *Attorney, Agent, or Firm* — Dentons US LLP

(57) ABSTRACT

Disclosed are an image coding/decoding method and an apparatus therefor. Specifically, a method for decoding an image by a decoding apparatus may include: deriving an intra prediction mode of a current block; configuring reference samples with samples neighboring to an upper end and samples neighboring to a left side of the current block; generating a prediction block of the current block by using the reference sample; and filtering a sample adjacent to a top boundary and/or a left boundary of the current block among the prediction samples, in which when the current block is a non-square block, whether to filter the sample adjacent to the top boundary of the current block may be determined by considering only a width of the current block and whether to filter the sample adjacent to the left boundary of the current block may be determined by considering only a height of the current block.

11 Claims, 46 Drawing Sheets

Related U.S. Application Data

(60) Provisional application No. 62/383,589, filed on Sep. 5, 2016.

(51) Int. Cl.
  *H04N 19/117* (2014.01)
  *H04N 19/11* (2014.01)
  *H04N 19/44* (2014.01)
  *H04N 19/593* (2014.01)
  *H04N 19/96* (2014.01)

(52) U.S. Cl.
  CPC .......... *H04N 19/176* (2014.11); *H04N 19/44* (2014.11); *H04N 19/593* (2014.11); *H04N 19/96* (2014.11)

(58) Field of Classification Search
  USPC ............... 375/240.03, 240.12; 382/233, 248
  See application file for complete search history.

(56) References Cited

U.S. PATENT DOCUMENTS

| | | | |
|---|---|---|---|
| 2015/0172677 A1 | 6/2015 | Norkin | H04N 19/86 375/240.02 |
| 2015/0296193 A1 | 10/2015 | Cote | G06T 3/4015 382/167 |
| 2017/0310986 A1* | 10/2017 | Lin | H04N 19/503 |
| 2018/0131962 A1* | 5/2018 | Chen | H04N 19/176 |
| 2021/0195199 A1* | 6/2021 | Choi | H04N 19/146 |

FOREIGN PATENT DOCUMENTS

| | | |
|---|---|---|
| EP | 2723078 A2 | 4/2014 |
| EP | 2747433 A1 | 6/2014 |
| KR | 1020130098254 A | 9/2013 |
| KR | 101369224 B1 | 3/2014 |
| KR | 101451923 B1 | 10/2014 |
| KR | 1020150038688 A | 4/2015 |
| KR | 101643121 B1 | 7/2016 |
| WO | 2012/096150 A1 | 7/2012 |
| WO | 2012/150849 A2 | 11/2012 |
| WO | 2016/066093 A1 | 5/2016 |

OTHER PUBLICATIONS

XP030117925: Rosewarne, C. et al., Joint Collaborative Team on Video Coding (JCT-VC) of ITU-T SG16 WP3 and ISO/IEC JTC1/SC29/WG11, 23rd Meeting, San Diego, USA, Feb. 26, 2016, High Efficiency Video Coding (HEVC) Test Model 16 (HM 16) Improved Encoder Description Update 5, Editors, (66 Pages).

XP030150223: Chen, J. et al., Joint Video Exploration Team (JVET) of ITU-T SG 16 WP 3 and ISO/IEC JTC 1/SC 29/WG 11, 3rd Meeting: Geneva, CH, May 26-Jun. 1, 2016, "Algorithm Description of Joint Exploration Test Model 3," Editors, (35 Pages).

* cited by examiner

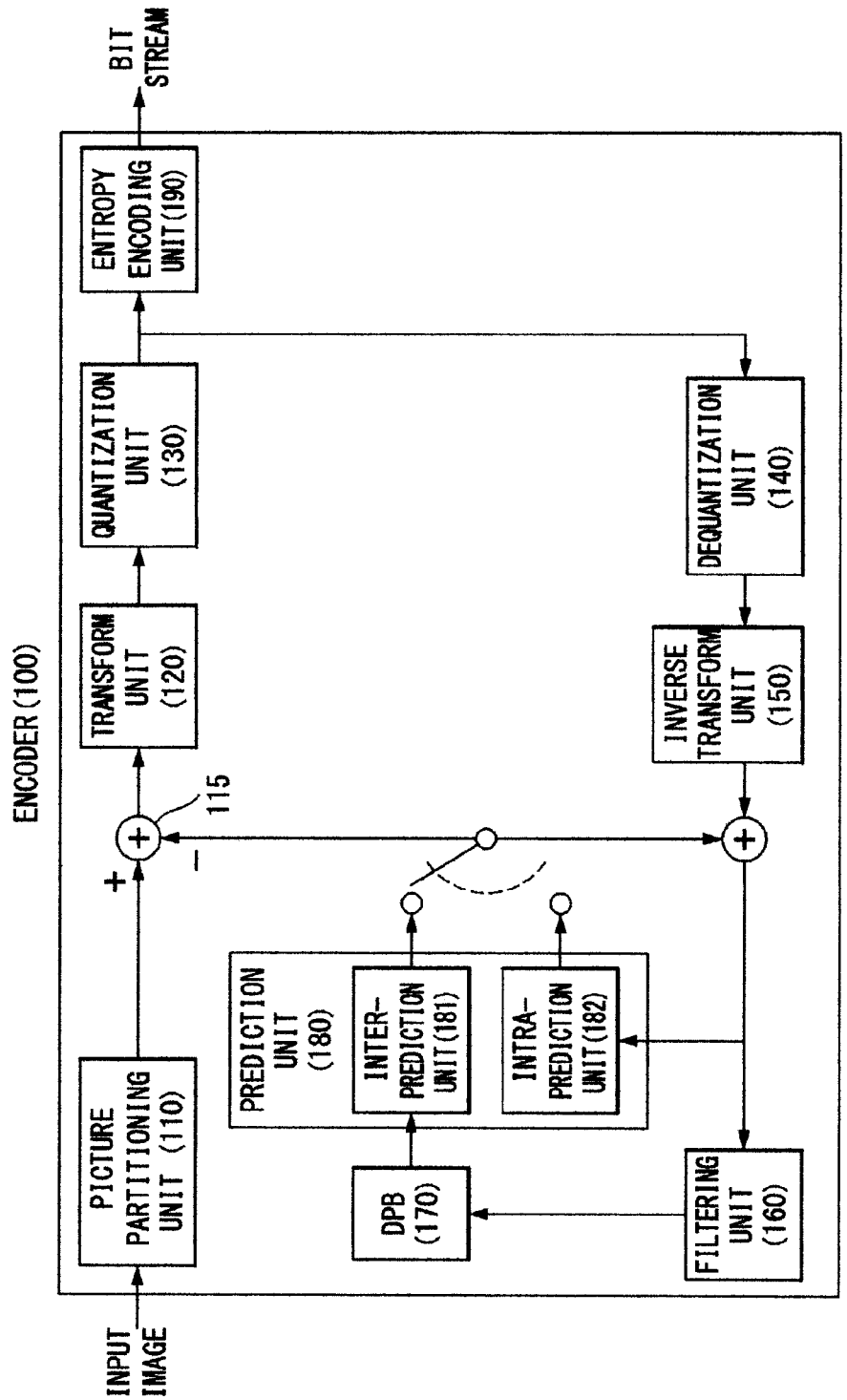
[FIG. 1]

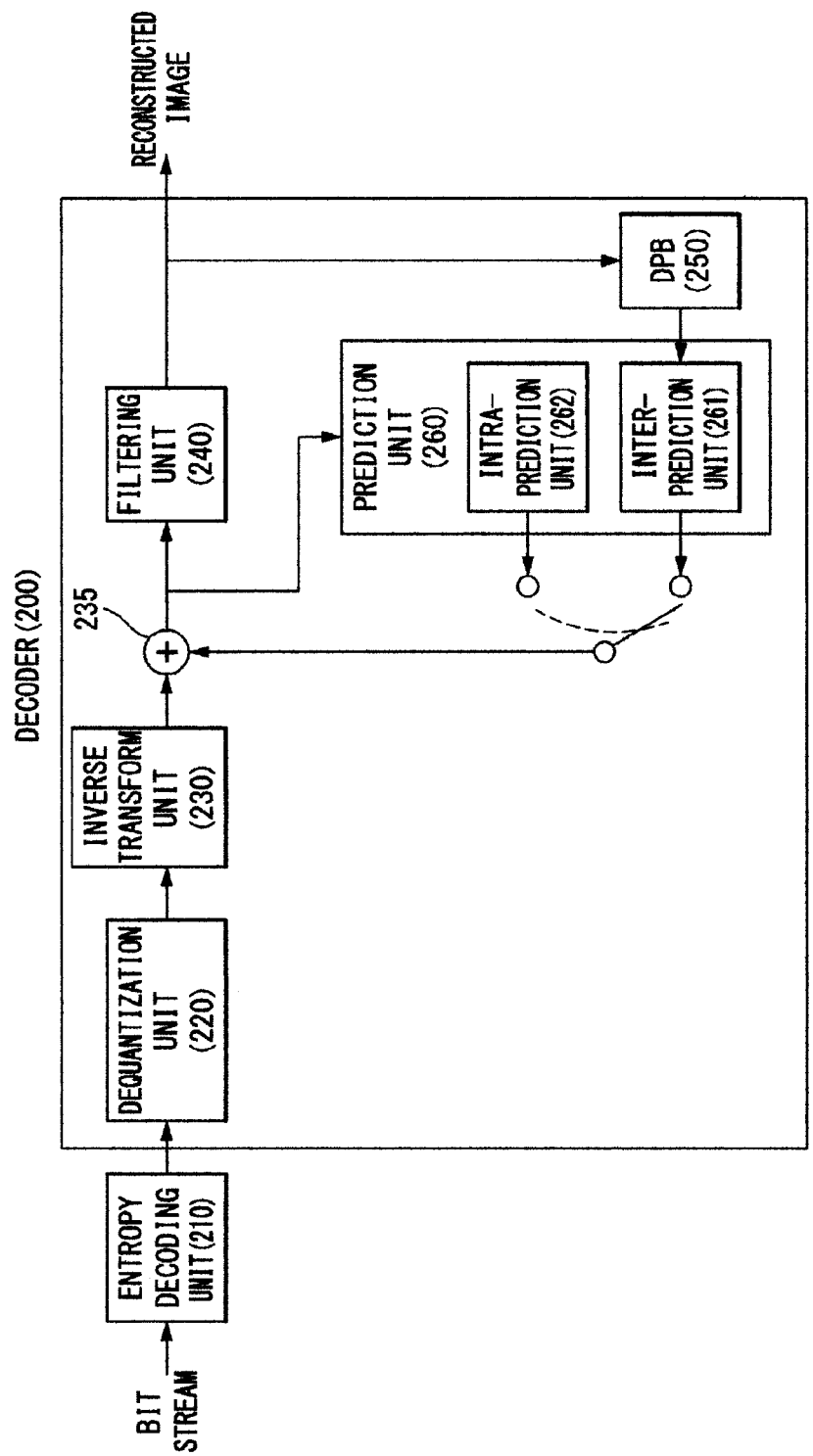
[FIG.2]

[FIG. 3a]
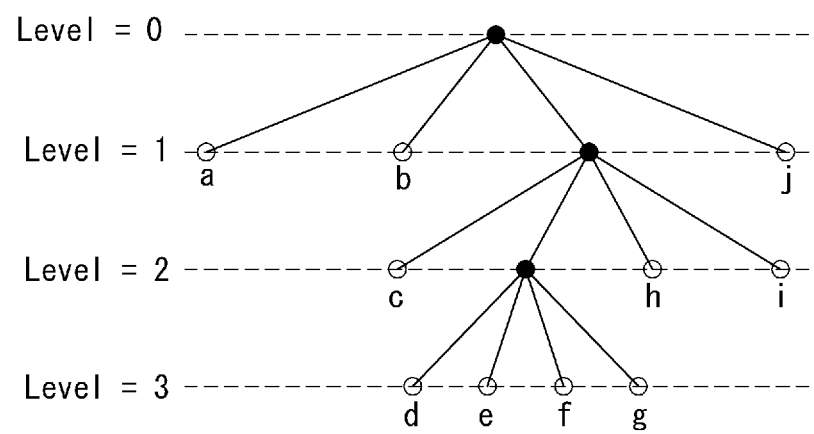
[FIG. 3b]
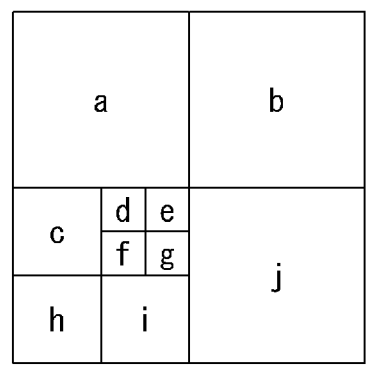

[FIG. 4]
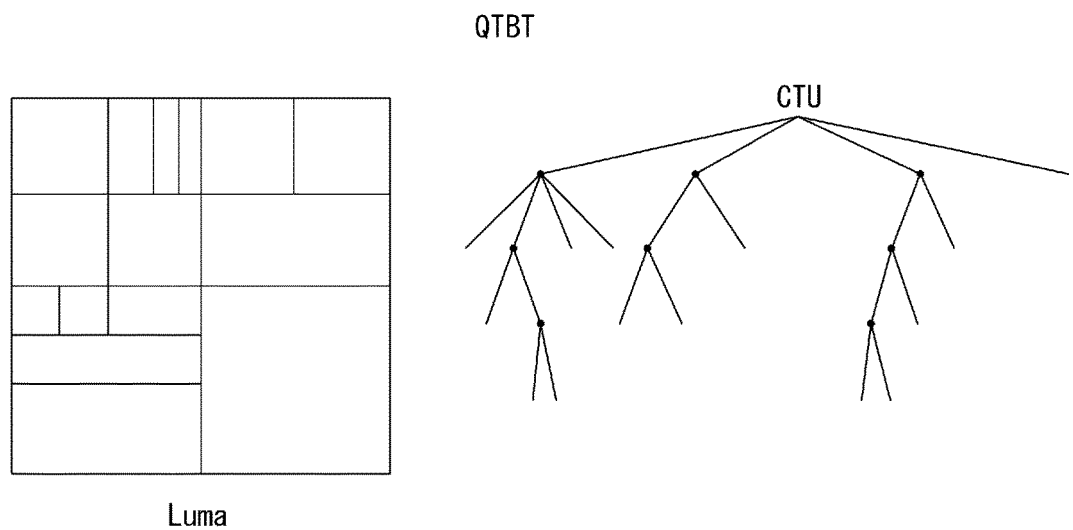

[FIG. 5a]
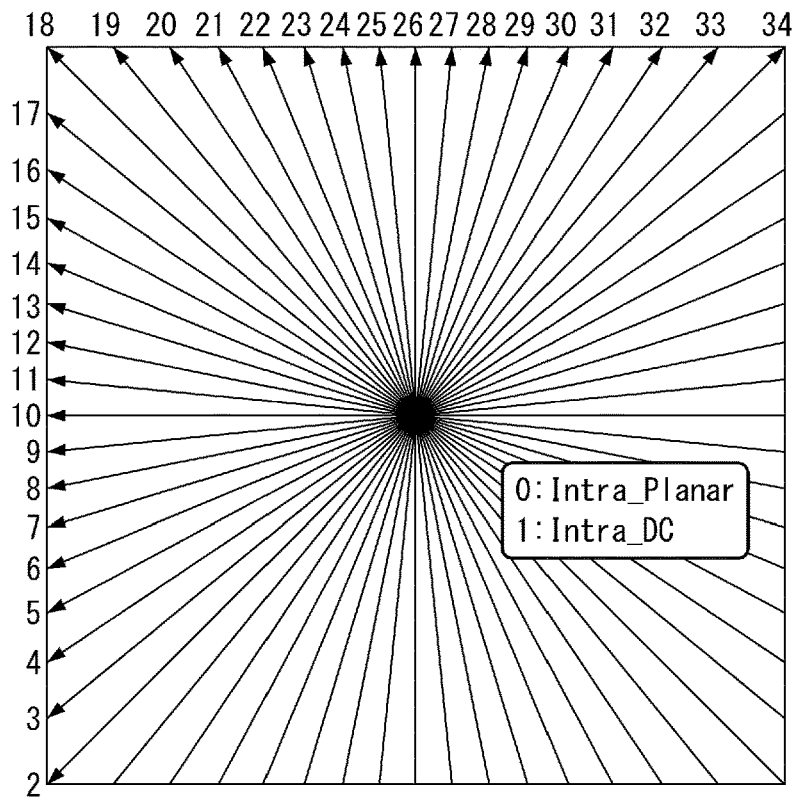
[FIG. 5b]
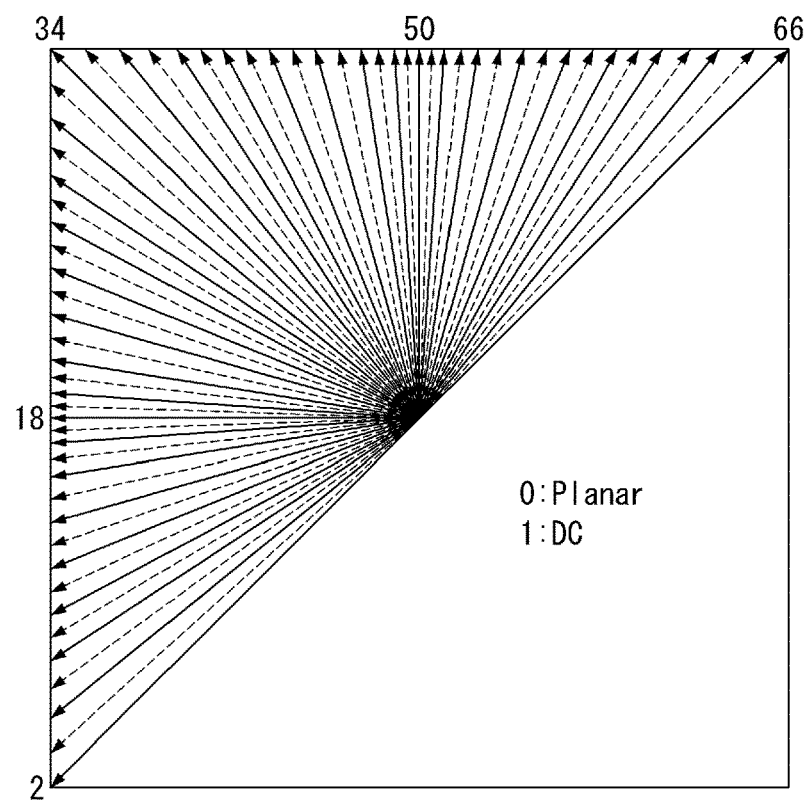

[FIG. 6]
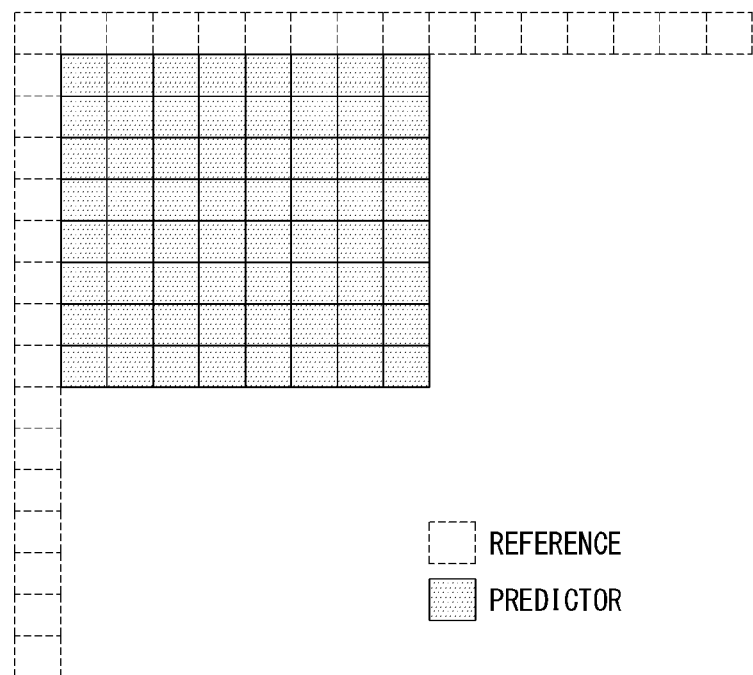

[FIG. 7]
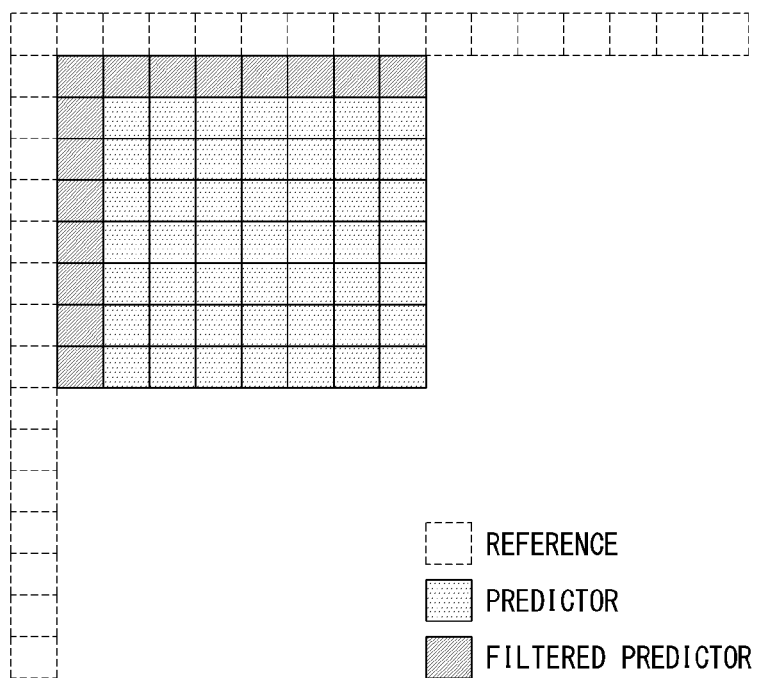

[FIG. 8a]
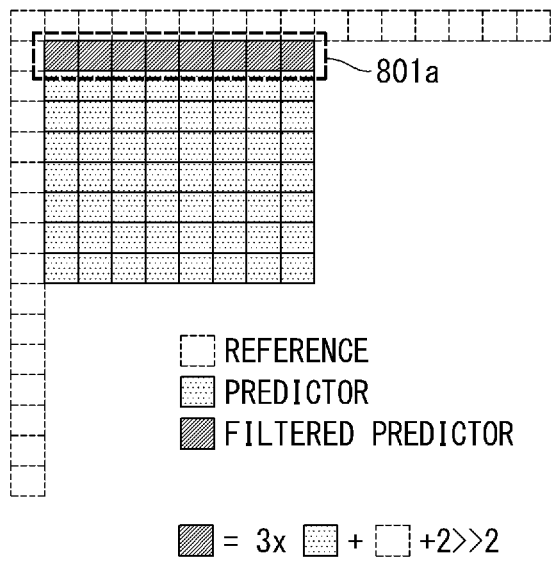
[FIG. 8b]
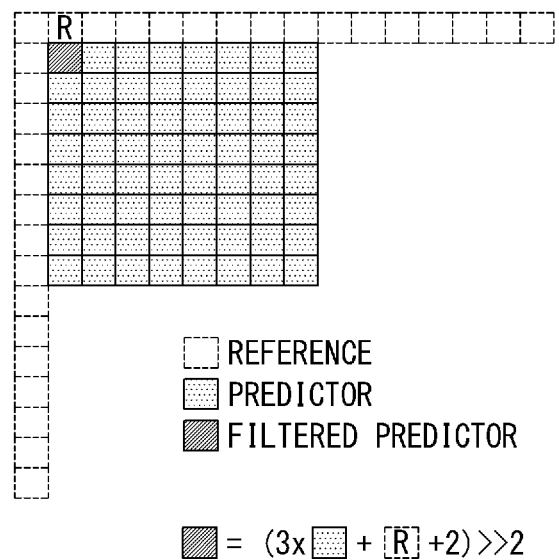

[FIG. 8c]
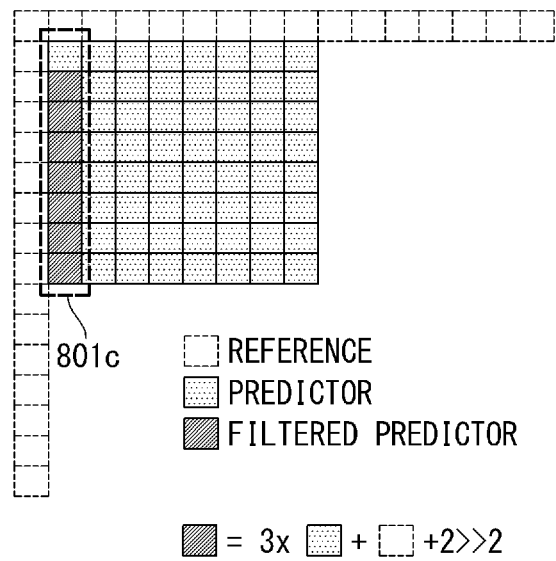
[FIG. 8d]
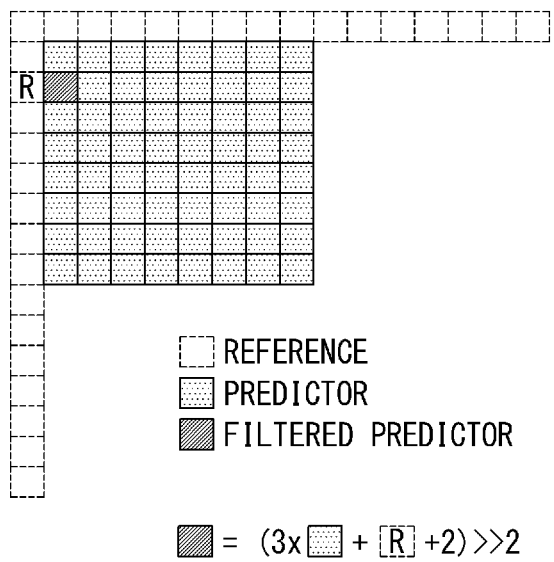

[FIG. 9a]
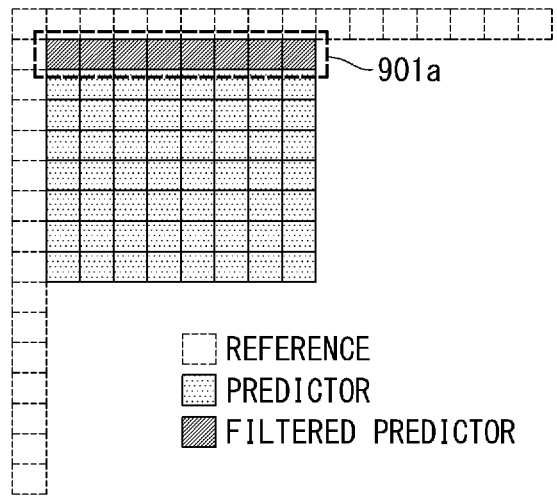
[FIG. 9b]
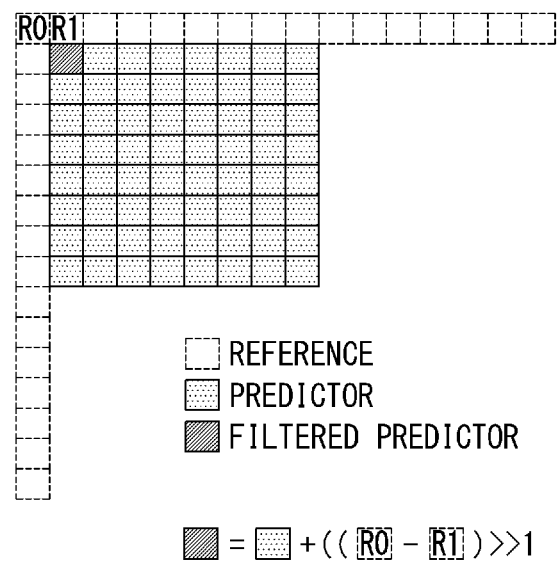

[FIG. 9c]
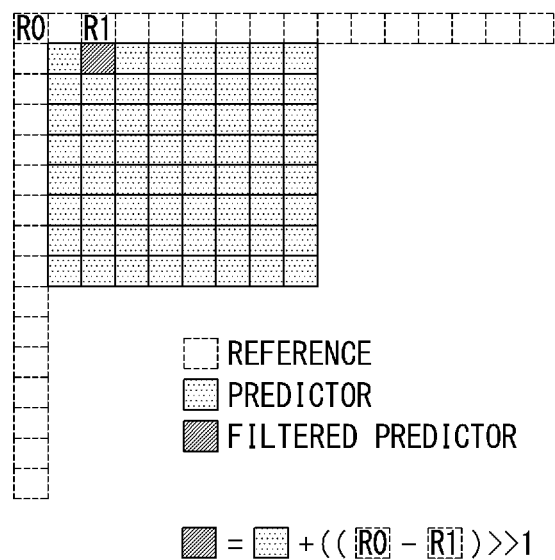

[FIG. 10a]
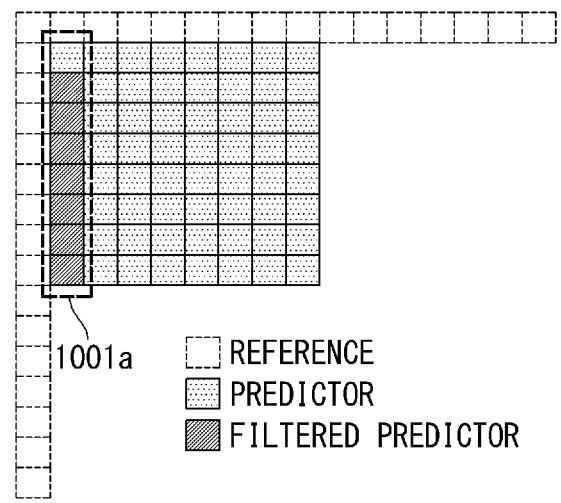
[FIG. 10b]
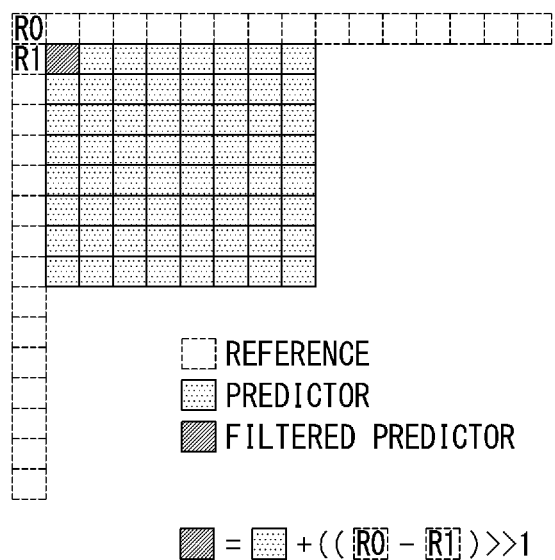

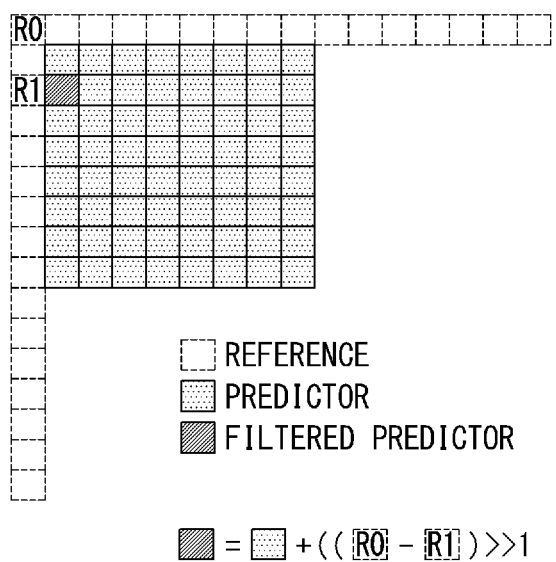
[FIG. 10c]

[FIG. 11]
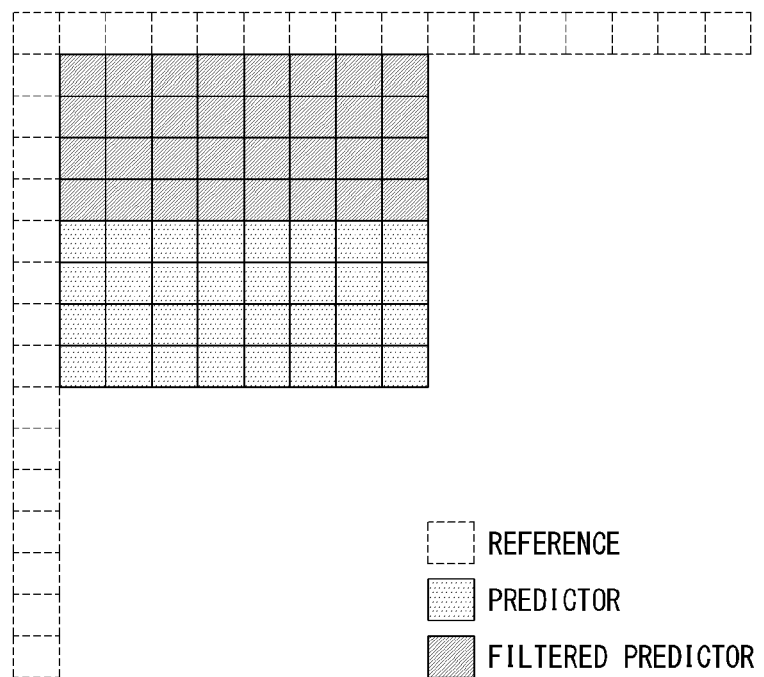

[FIG. 12a]
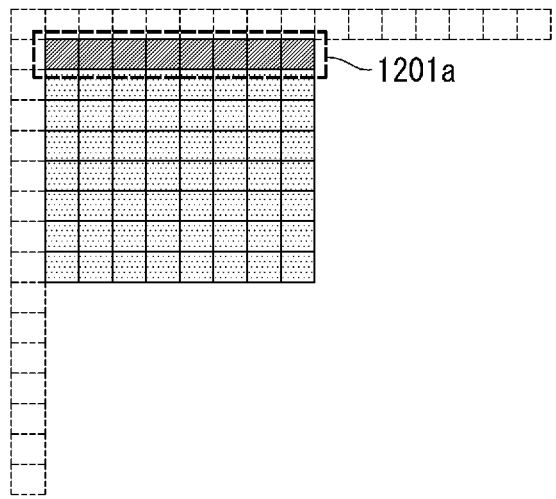
[FIG. 12b]
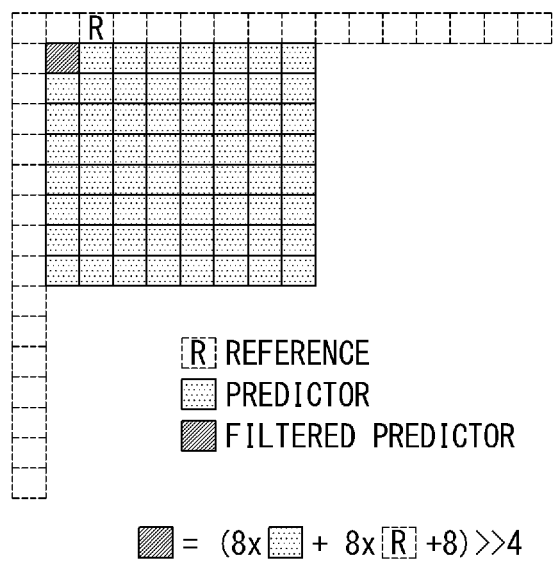

[FIG. 12c]
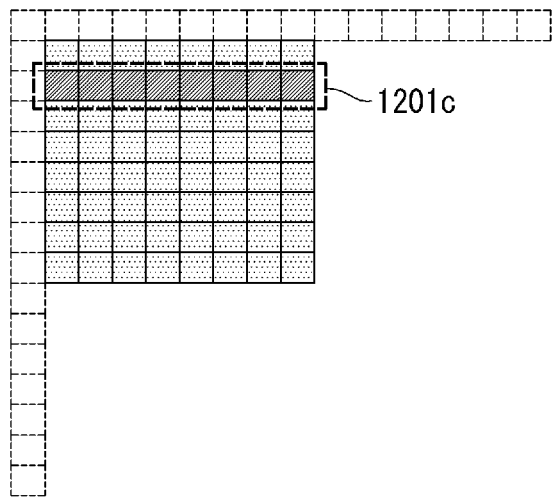
[FIG. 12d]
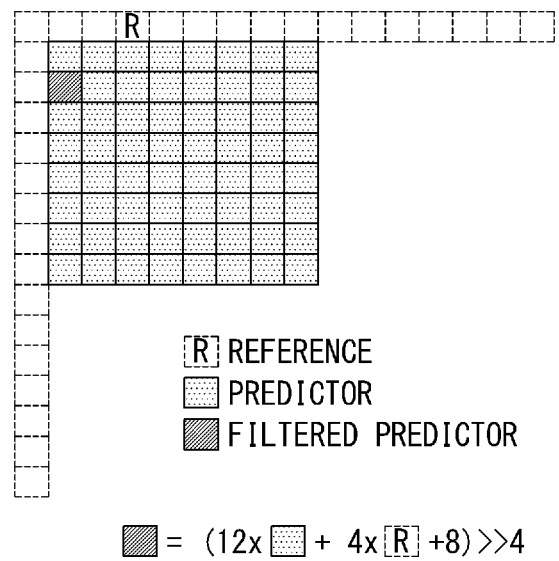

[FIG. 13a]
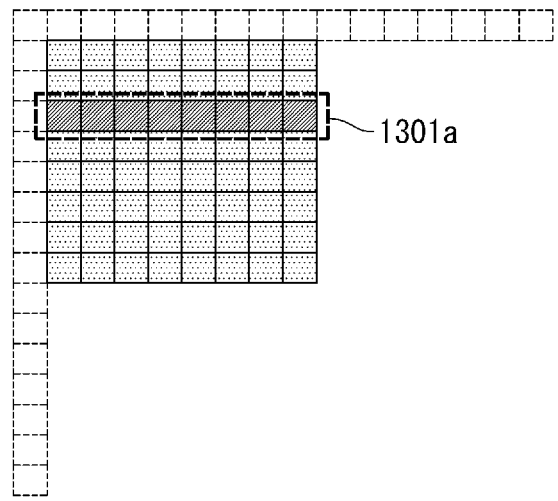
[FIG. 13b]
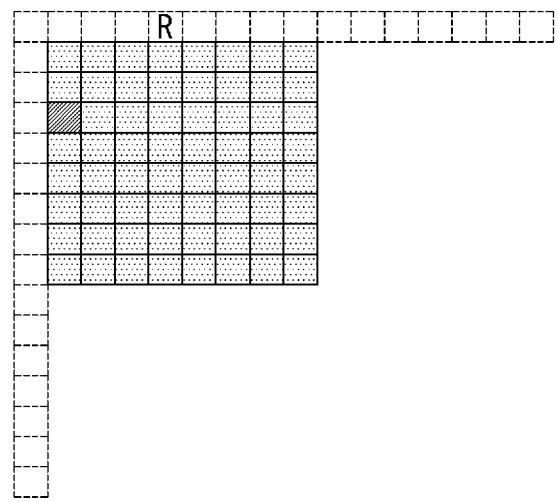

[FIG. 13c]
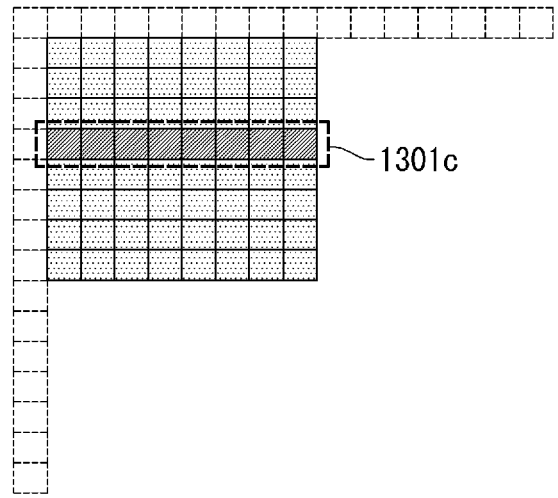
[FIG. 13d]
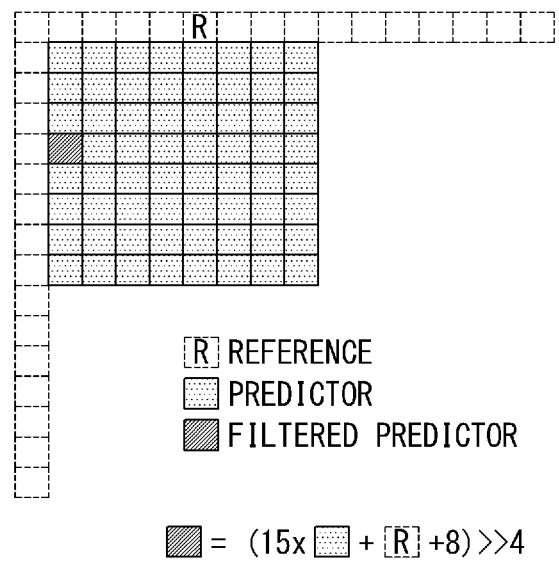

[FIG. 14]
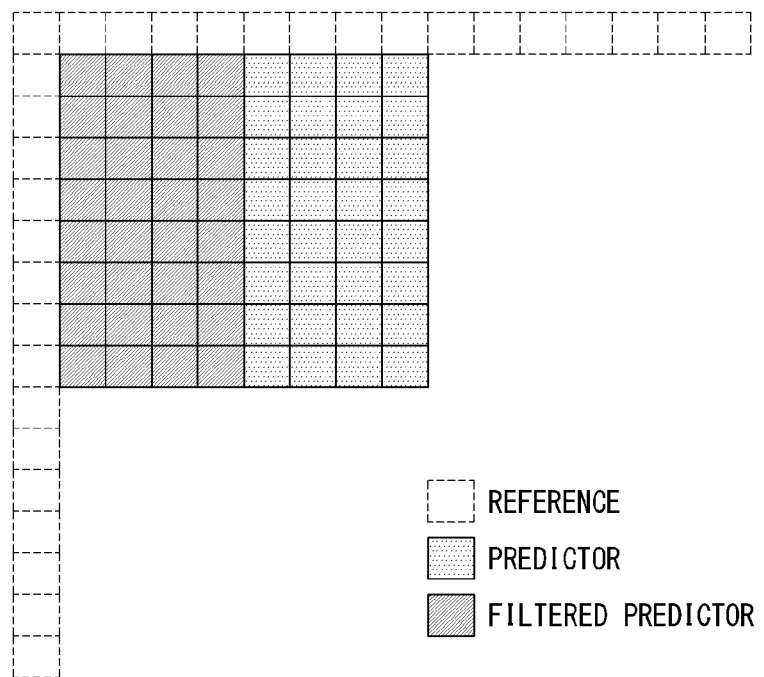

[FIG. 15a]
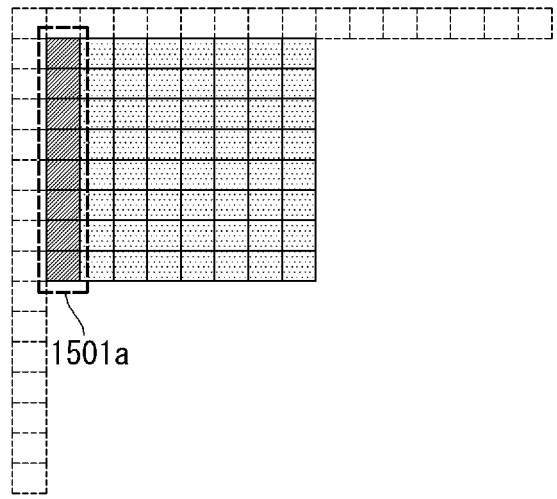
1501a
[FIG. 15b]
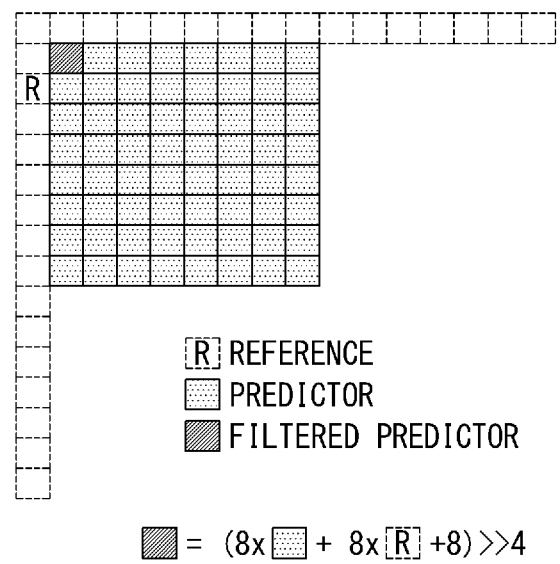

[FIG. 15c]
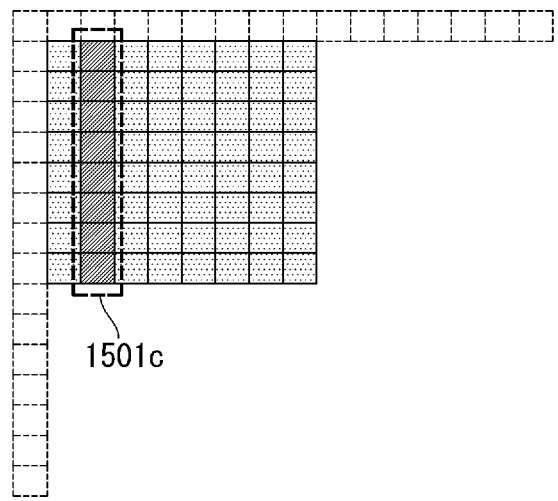
1501c
[FIG. 15d]
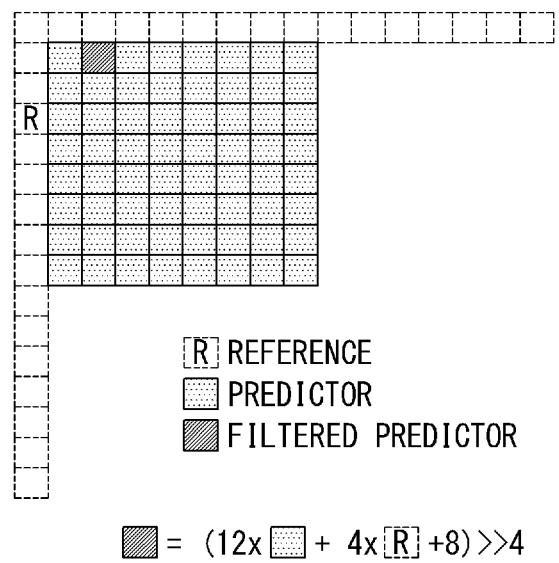

[FIG. 16a]
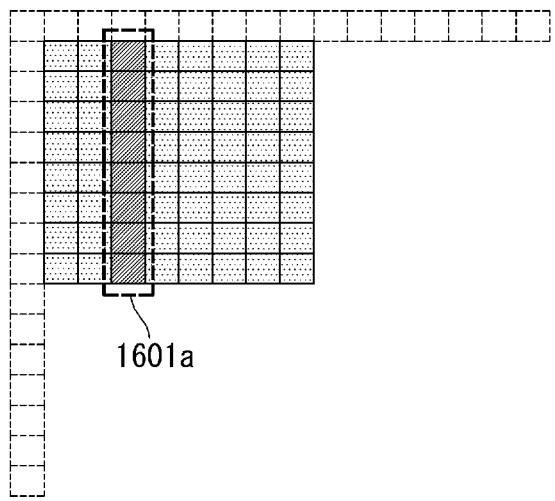
1601a
[FIG. 16b]
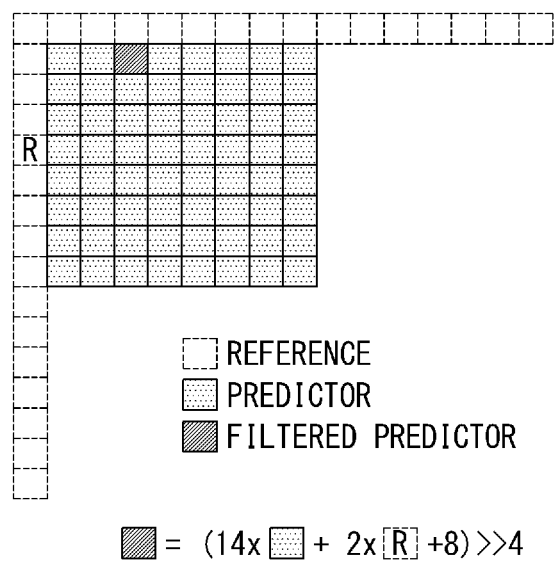

[FIG. 16c]
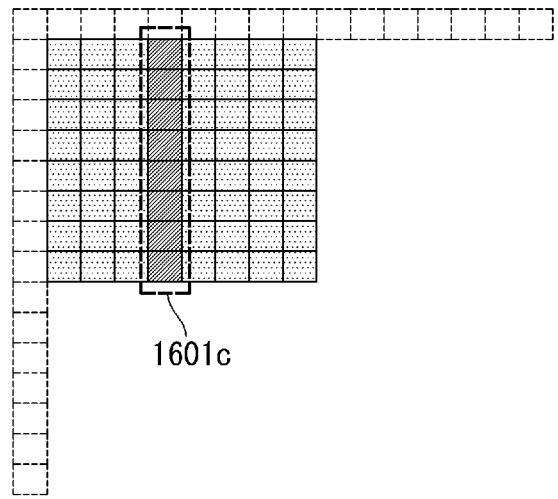
1601c
[FIG. 16d]
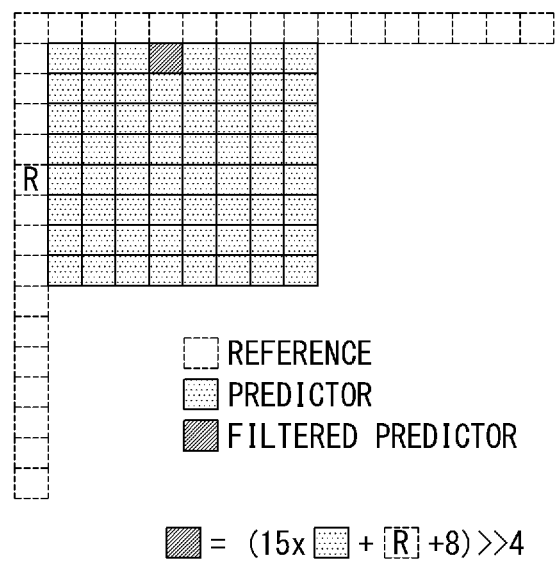

[FIG. 17a]
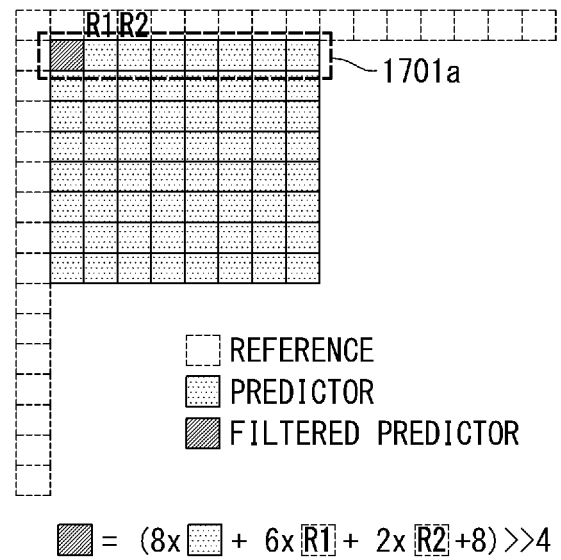
[FIG. 17b]
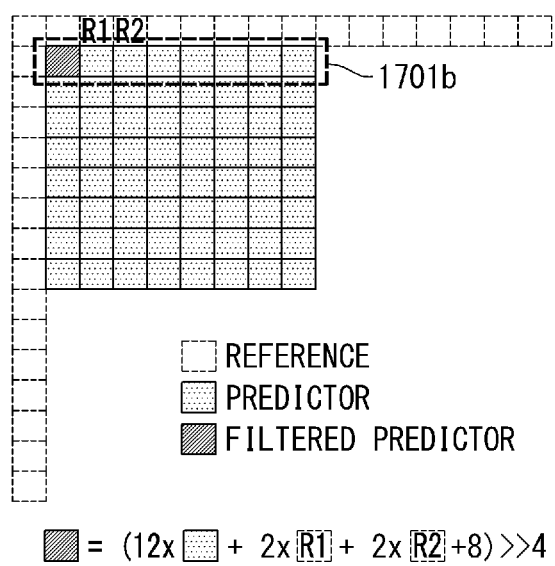

[FIG. 17c]
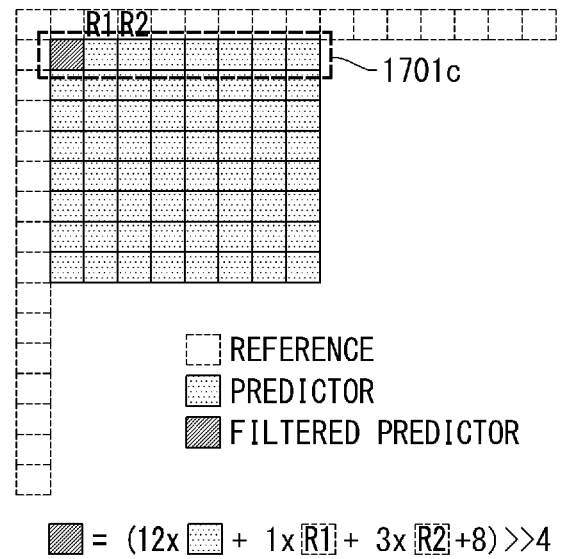
[FIG. 17d]
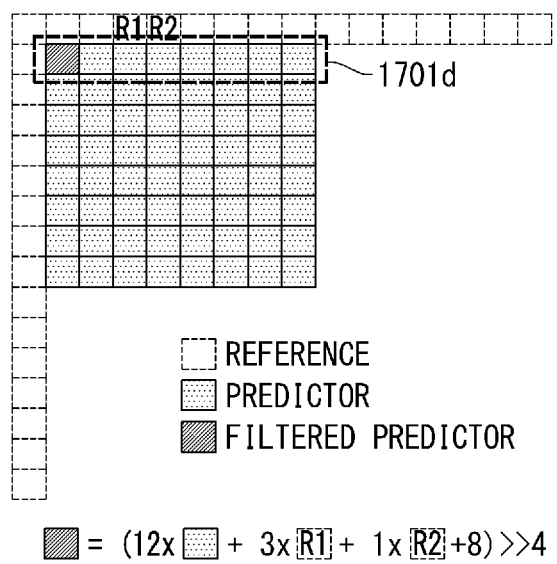

[FIG. 18a]
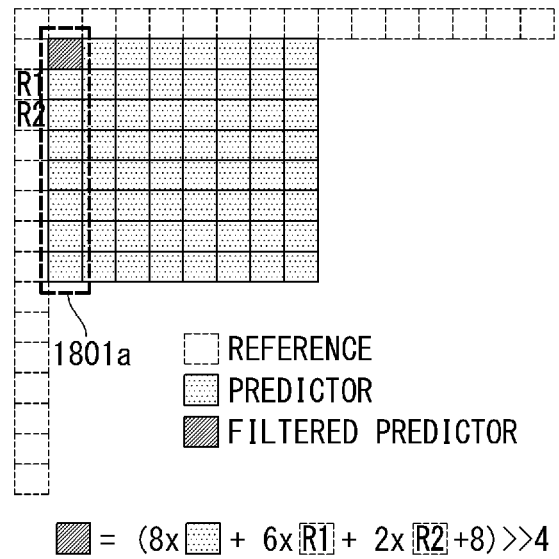
[FIG. 18b]
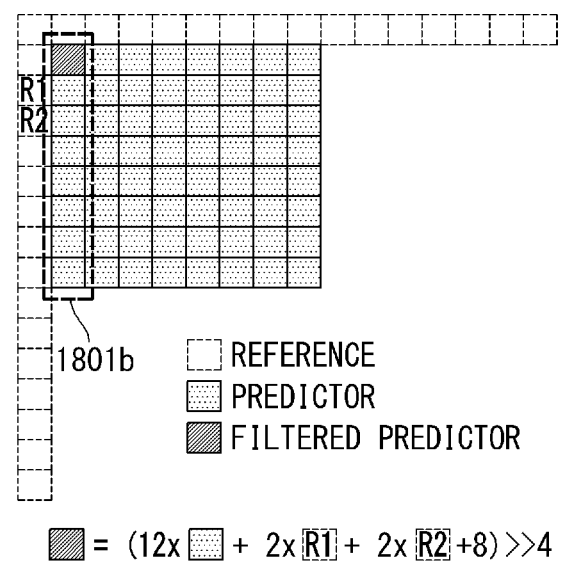

[FIG. 18c]
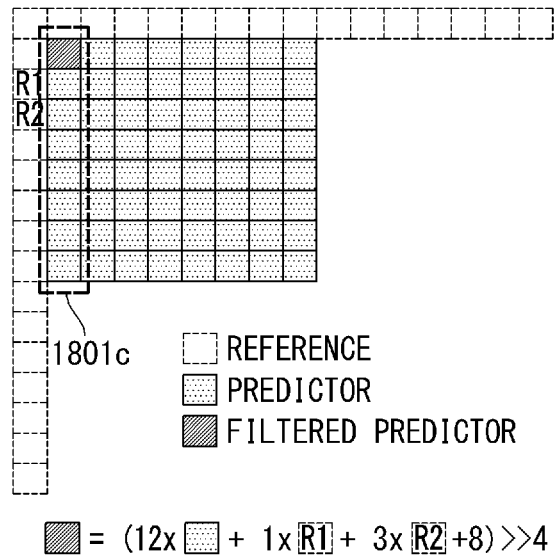
[FIG. 18d]
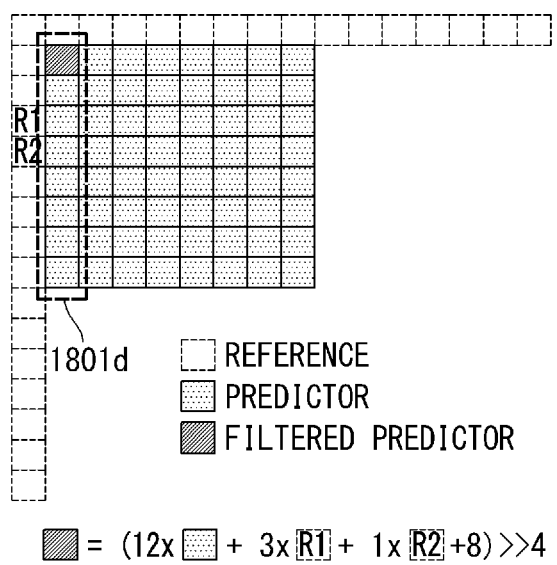

[FIG. 19a]
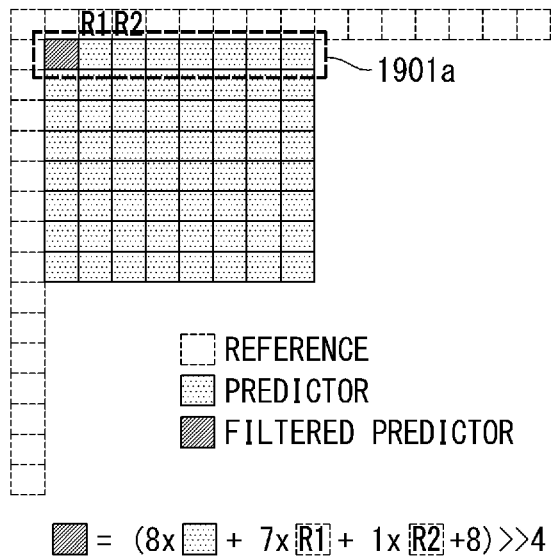
[FIG. 19b]
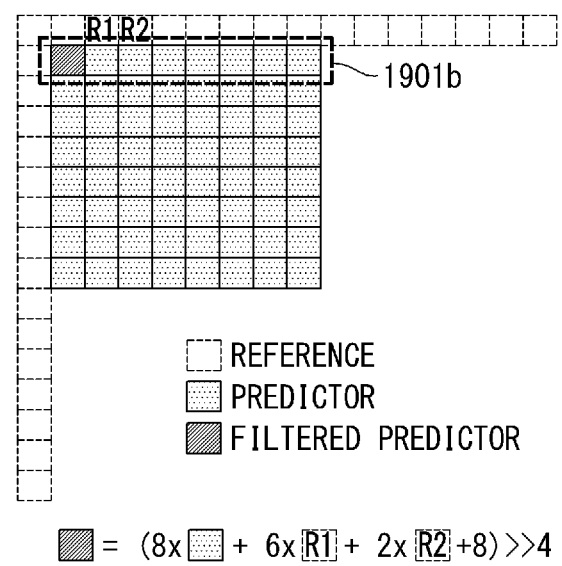

[FIG. 19c]
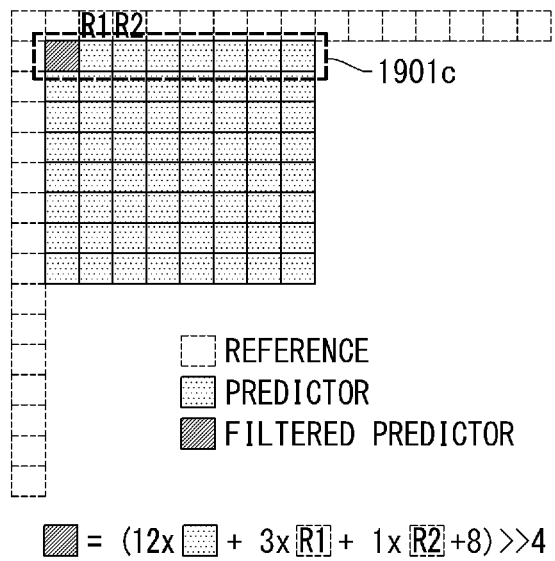
[FIG. 19d]
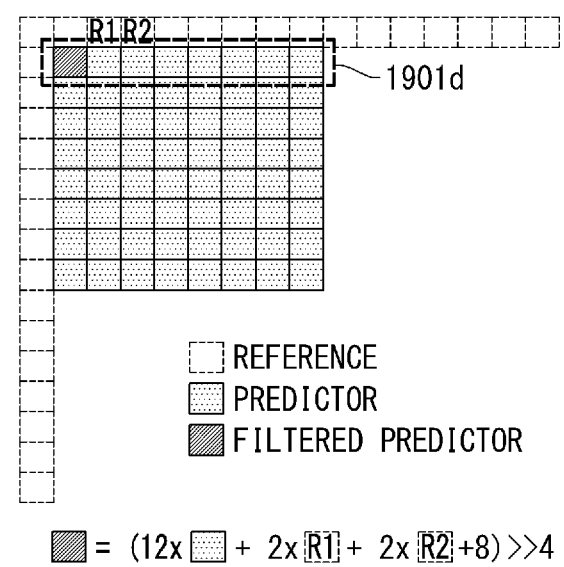

[FIG. 20a]
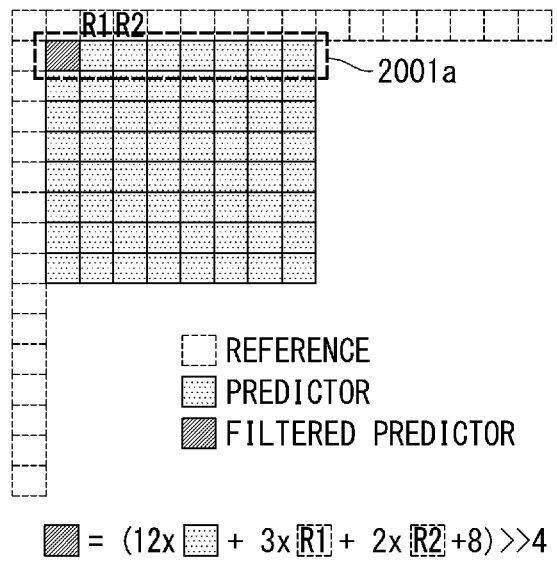
[FIG. 20b]
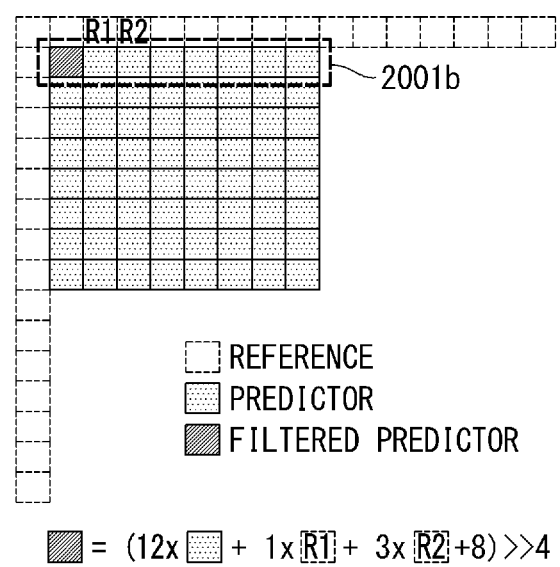

[FIG. 20c]
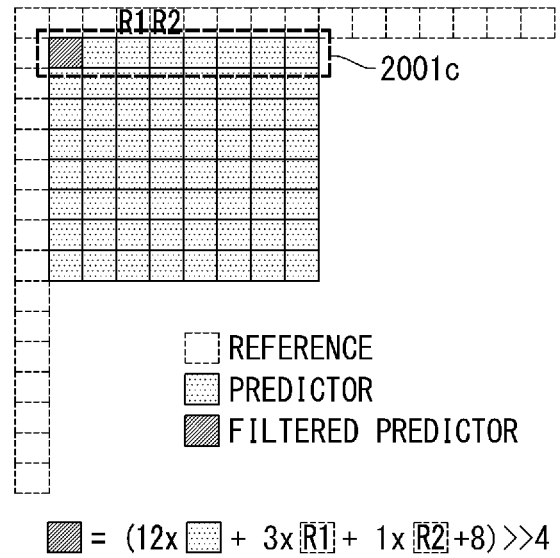
[FIG. 20d]
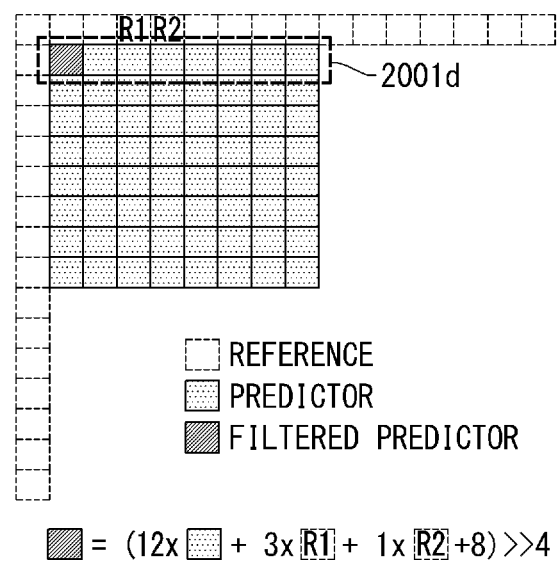

[FIG. 21a]
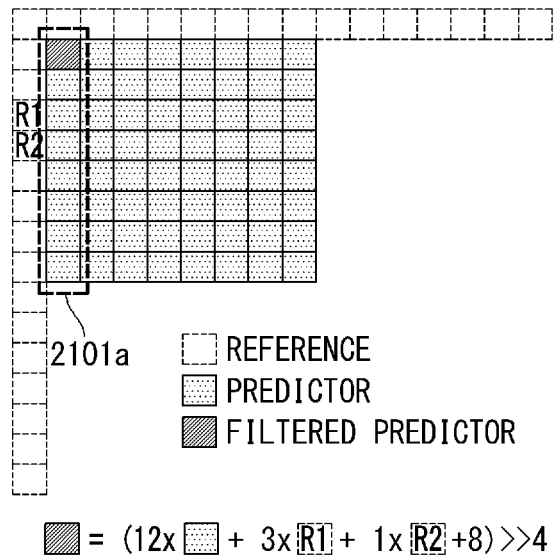
[FIG. 21b]
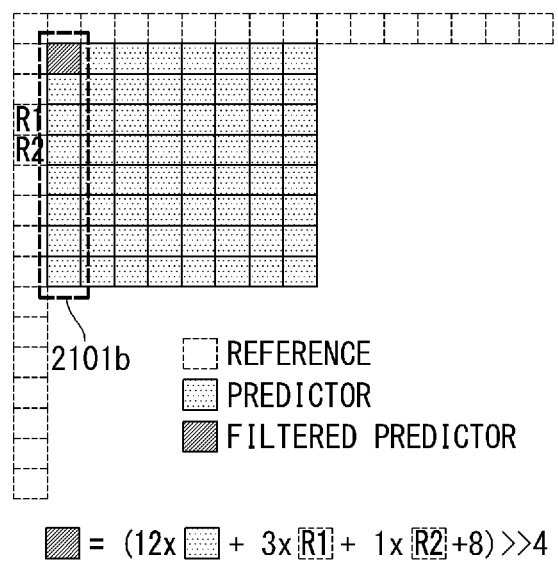

[FIG. 21c]
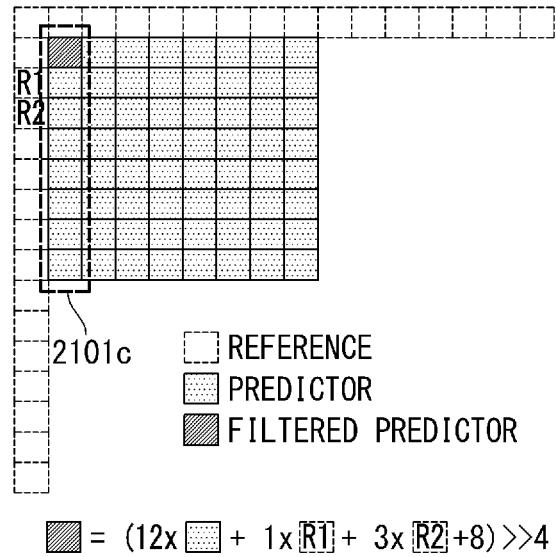
[FIG. 21d]
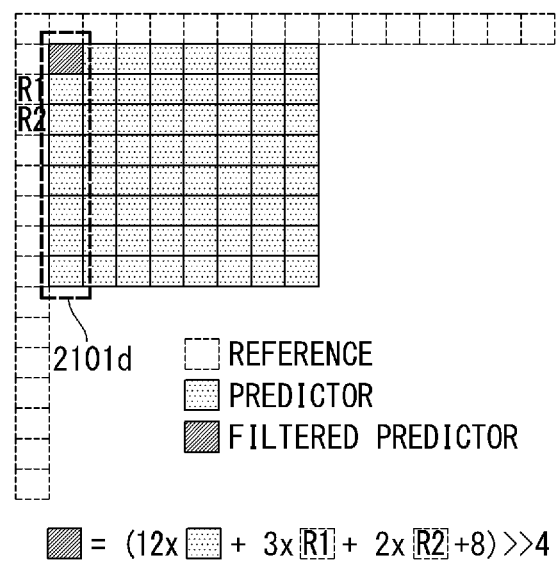

[FIG. 22a]
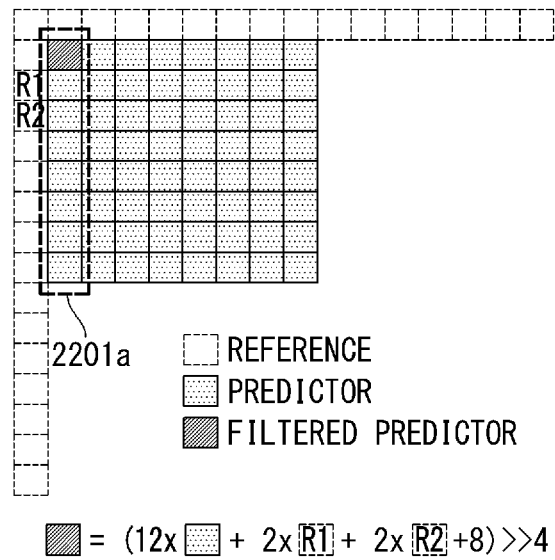
[FIG. 22b]
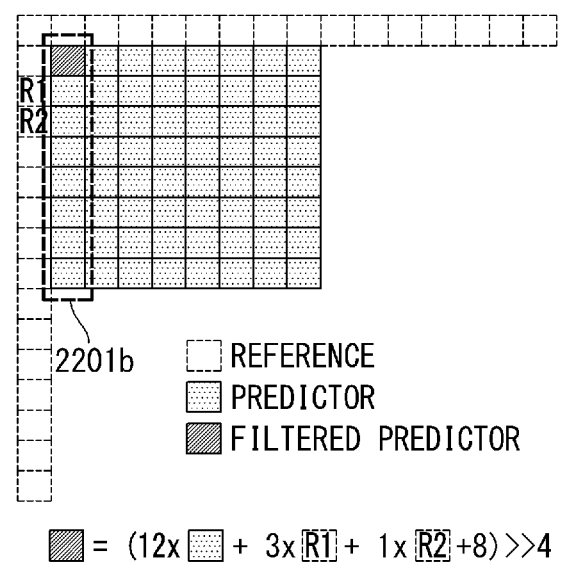

[FIG. 22c]
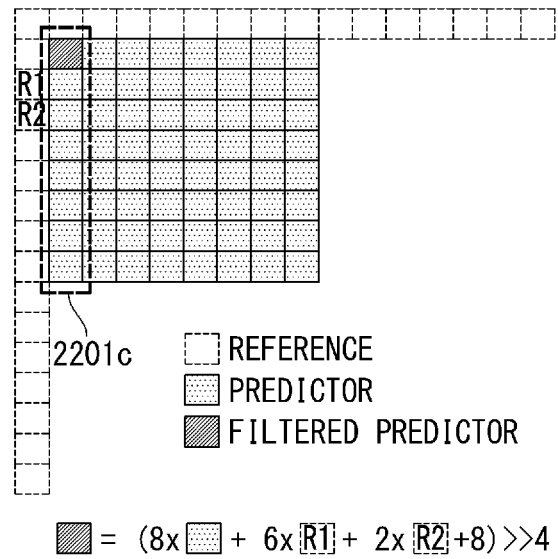
[FIG. 22d]
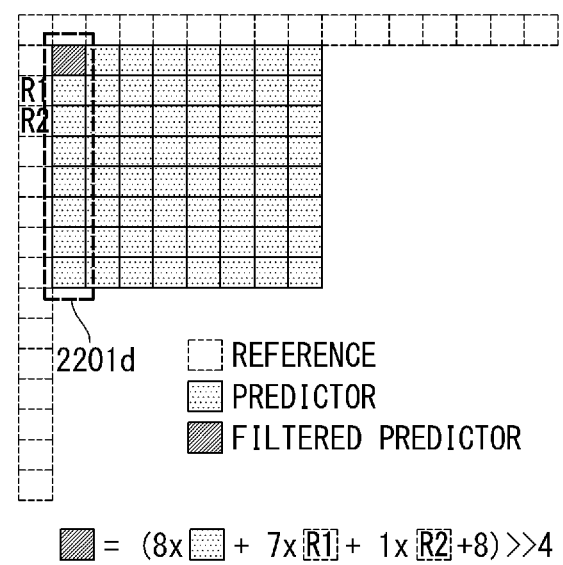

[FIG. 23]
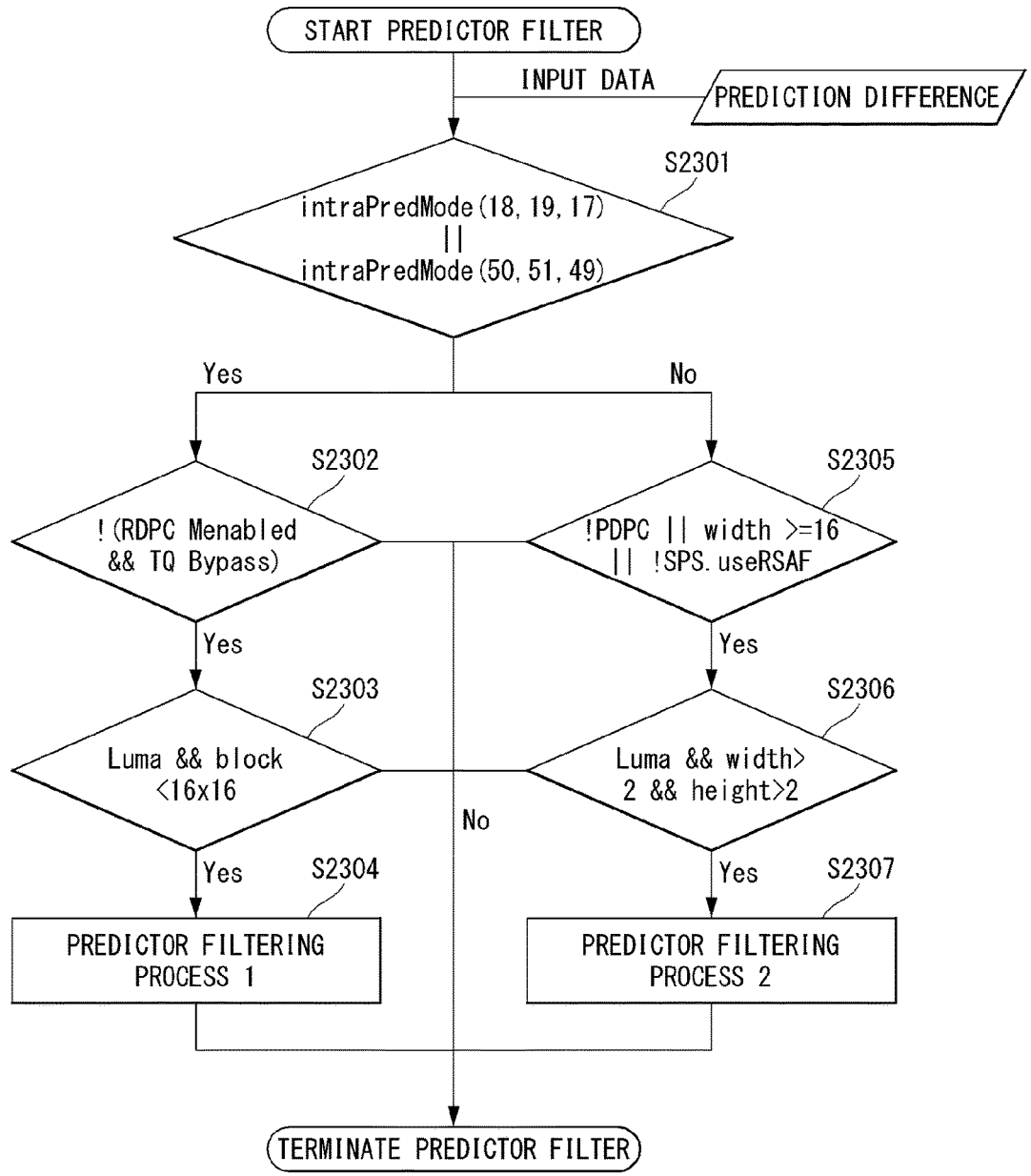

[FIG. 24]
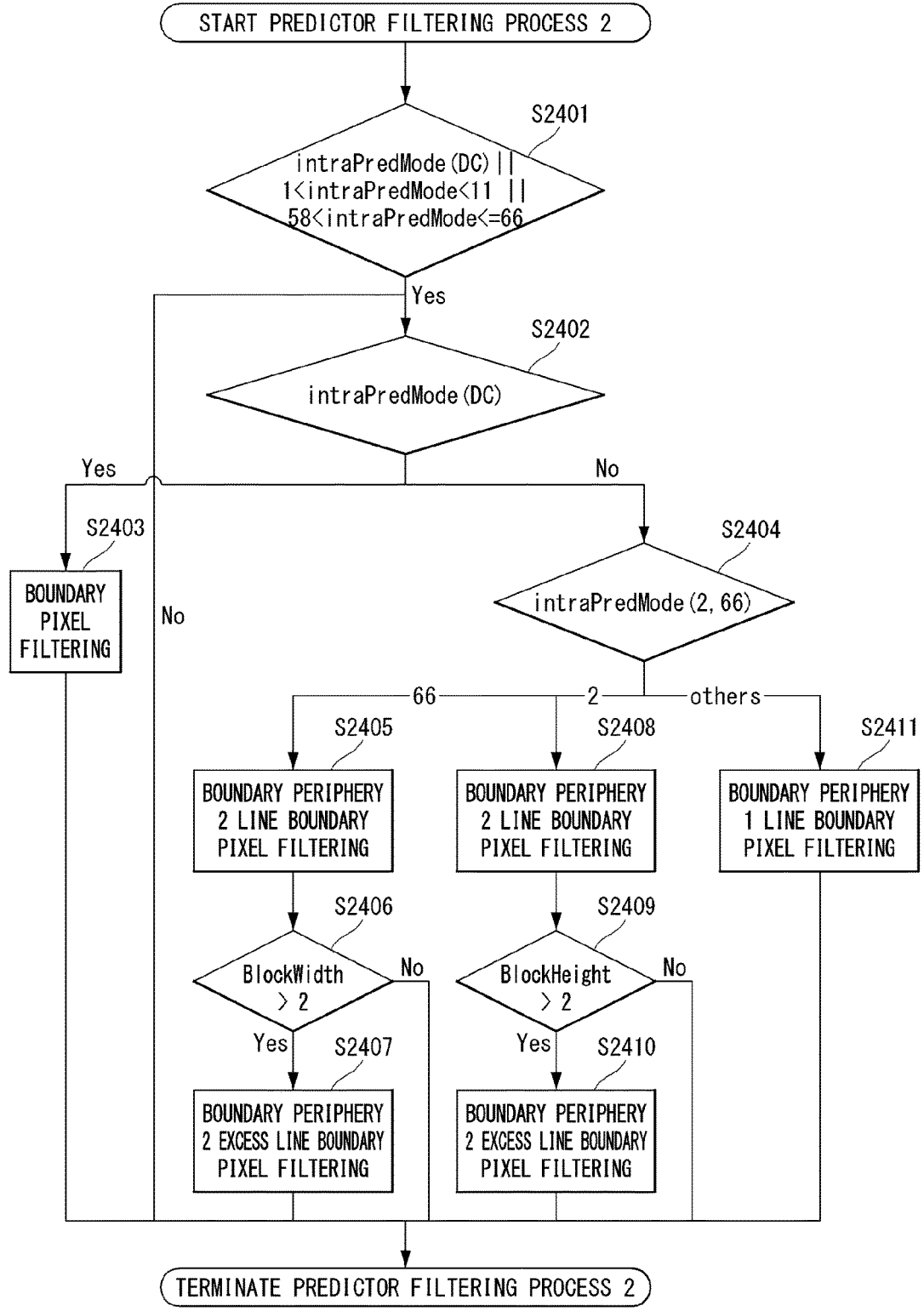

[FIG. 25]
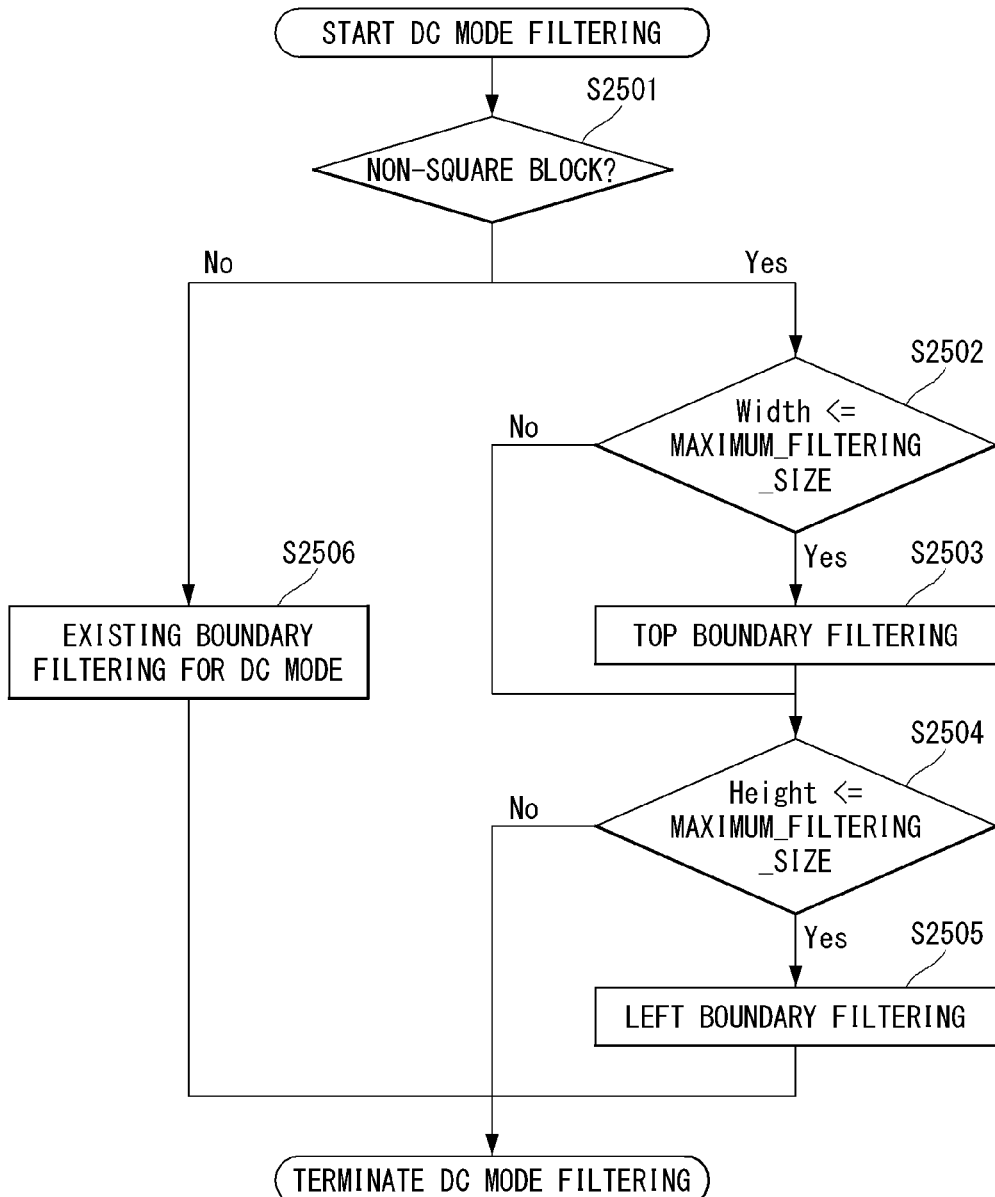

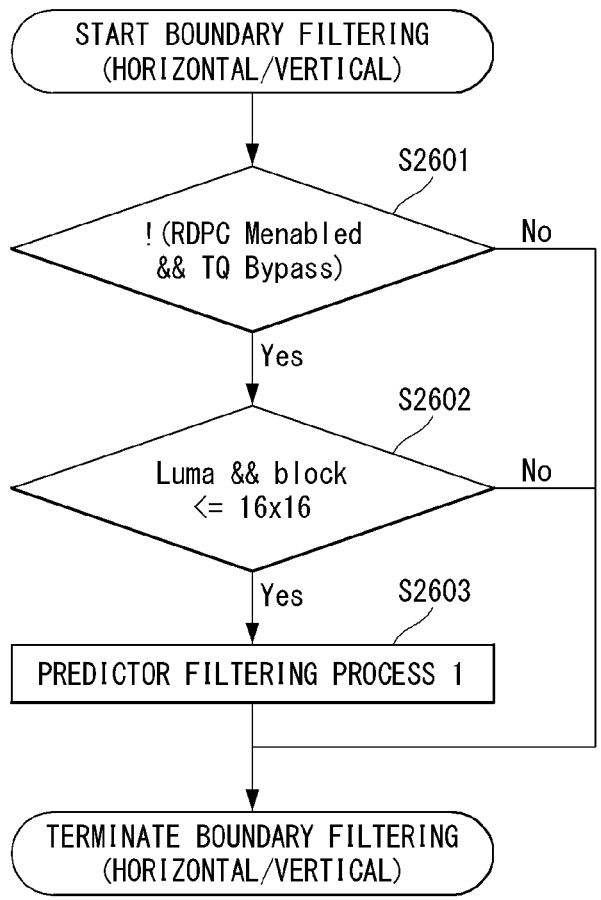
[FIG. 26]

[FIG. 27]
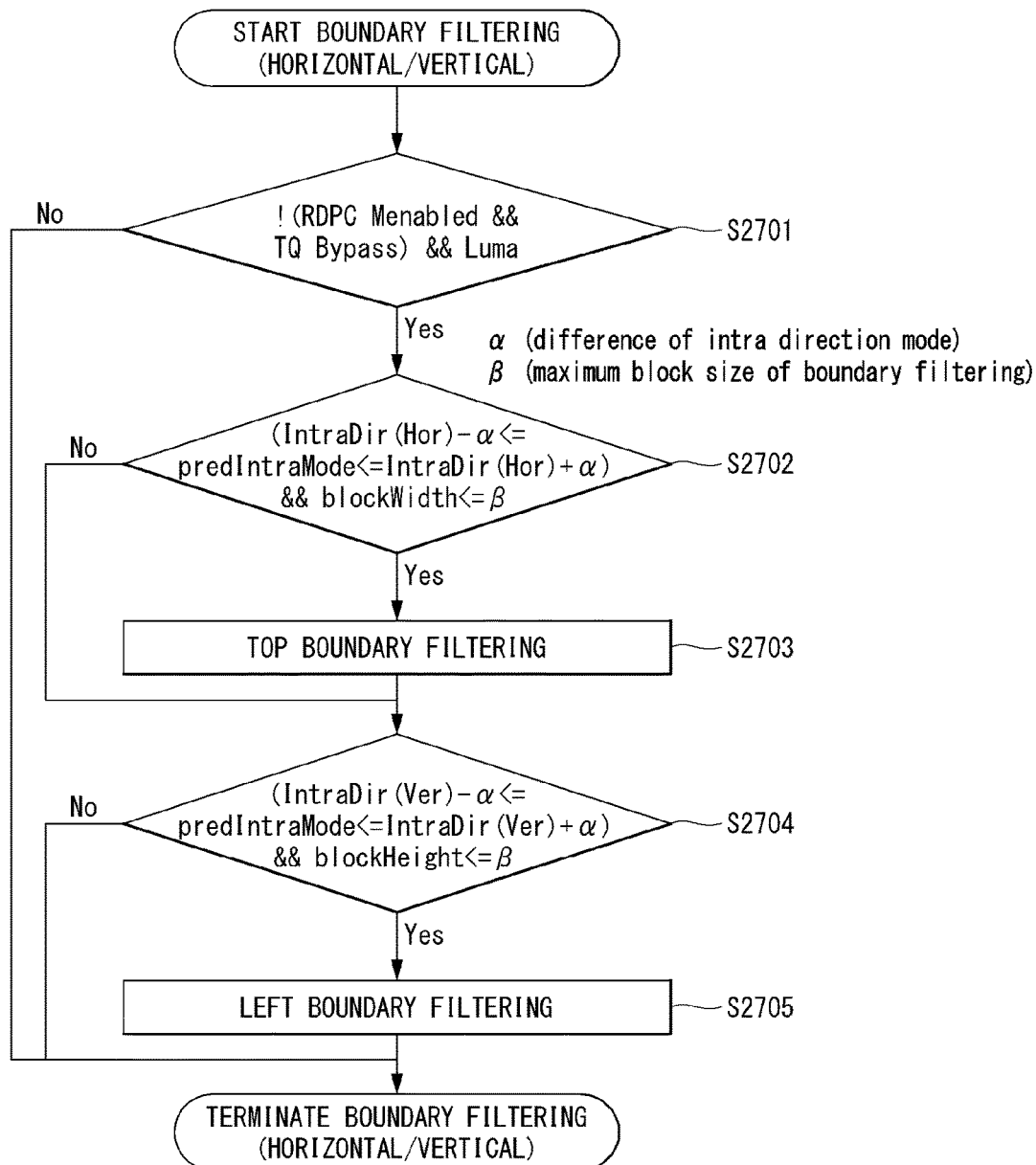

[FIG. 28a]
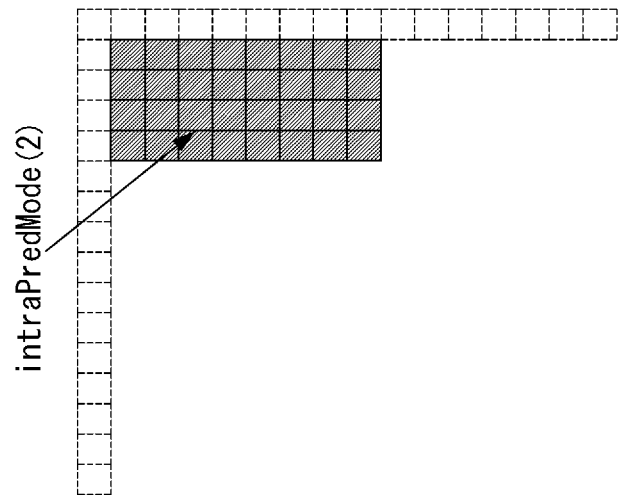
[FIG. 28b]
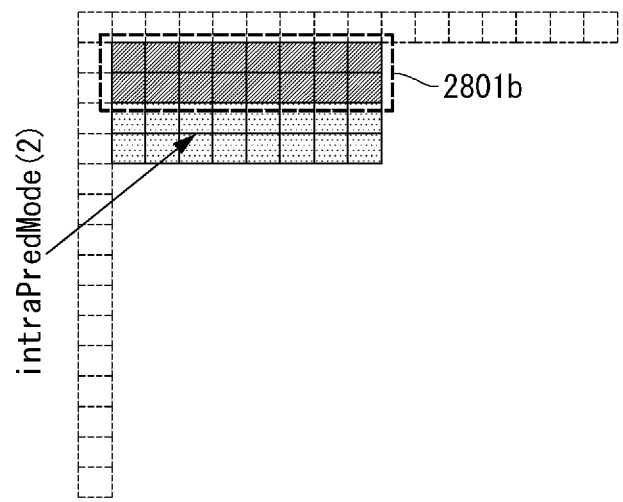

[FIG. 29a]
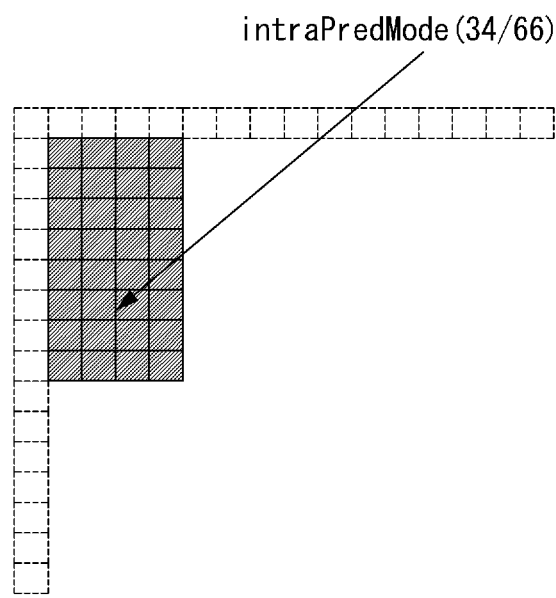
[FIG. 29b]
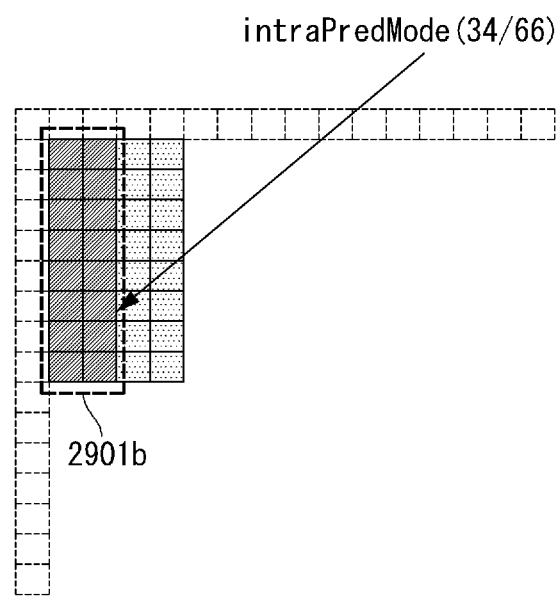

[FIG. 30]
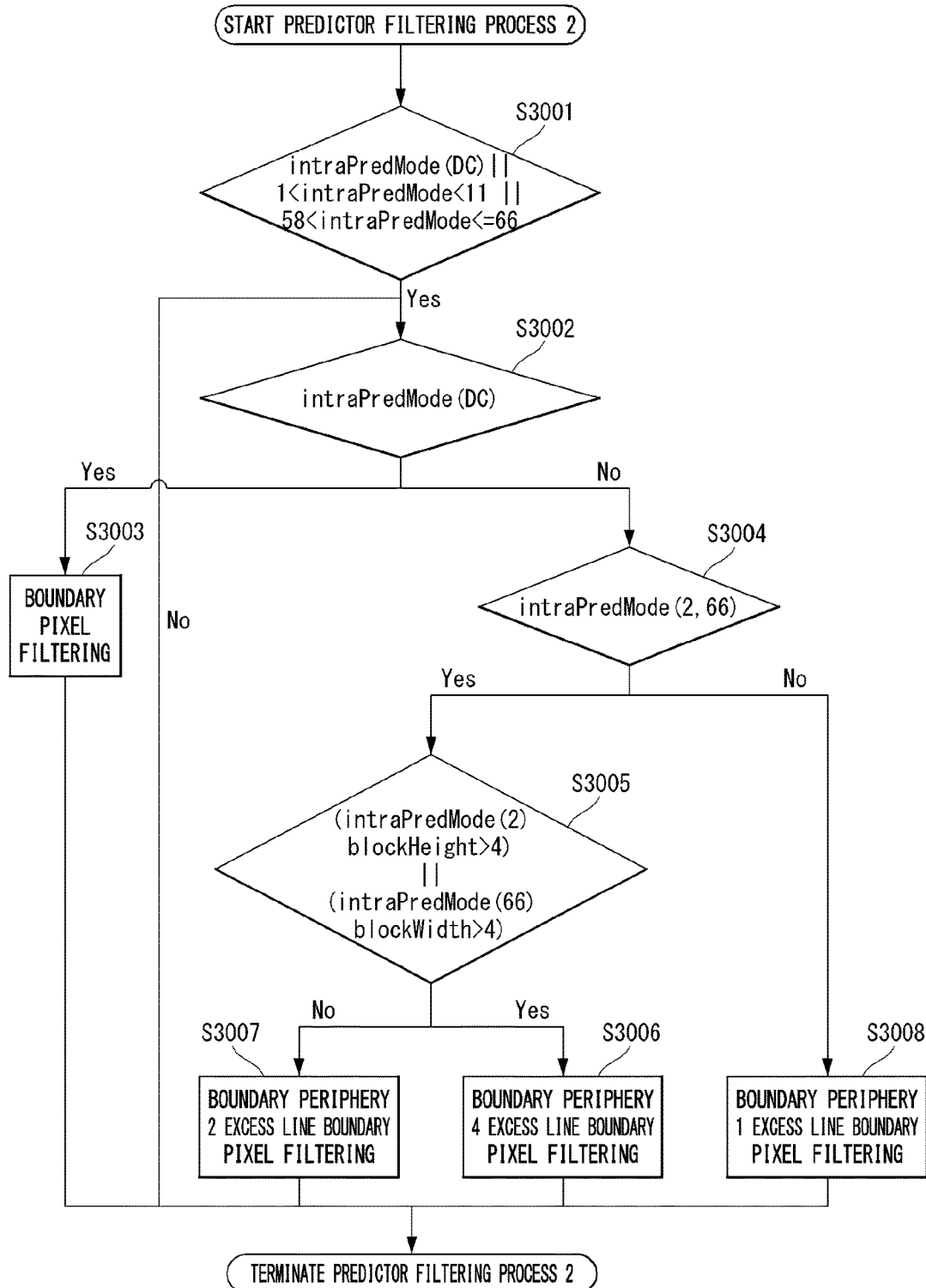

[FIG. 31]
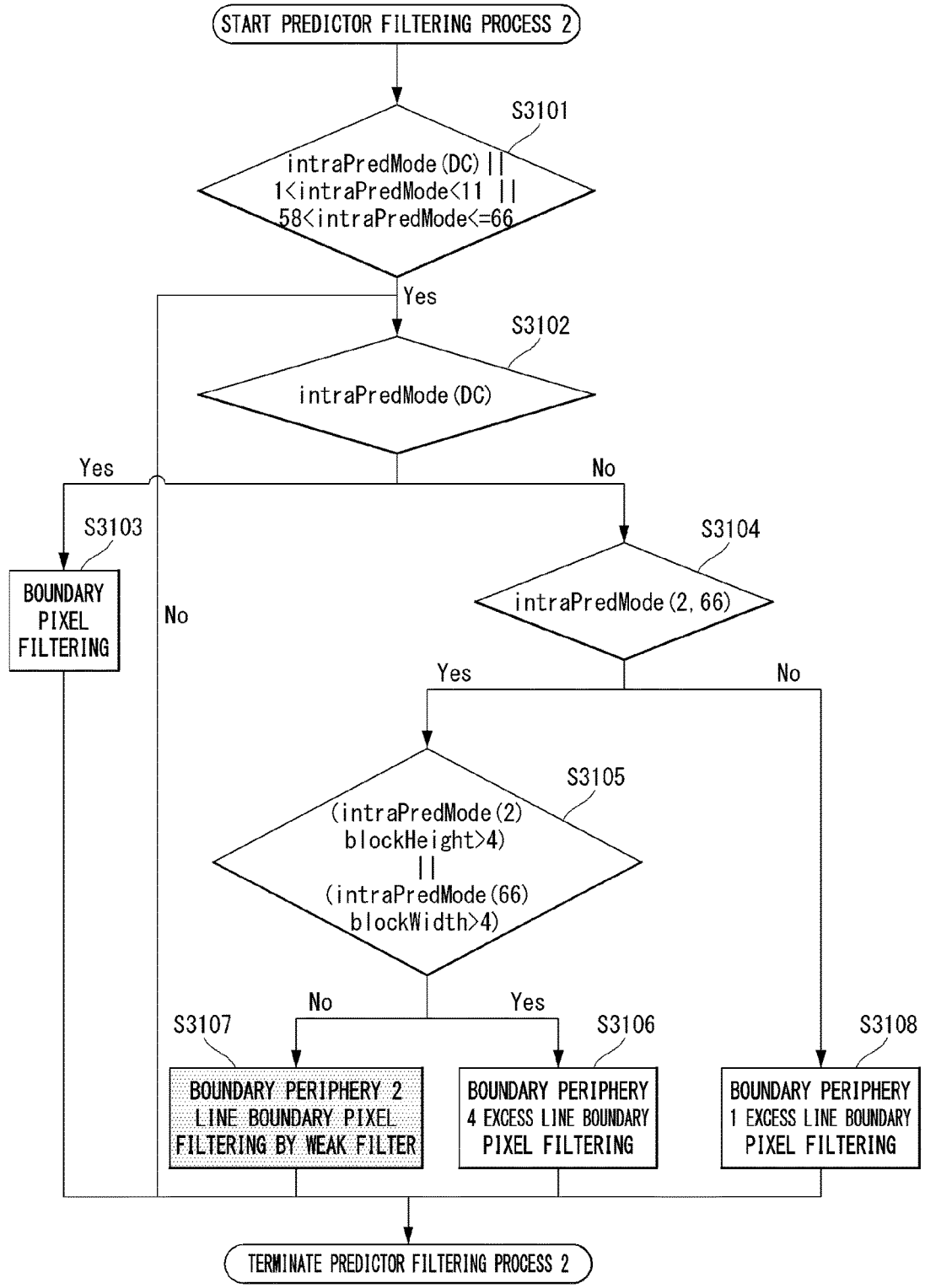

[FIG. 32]
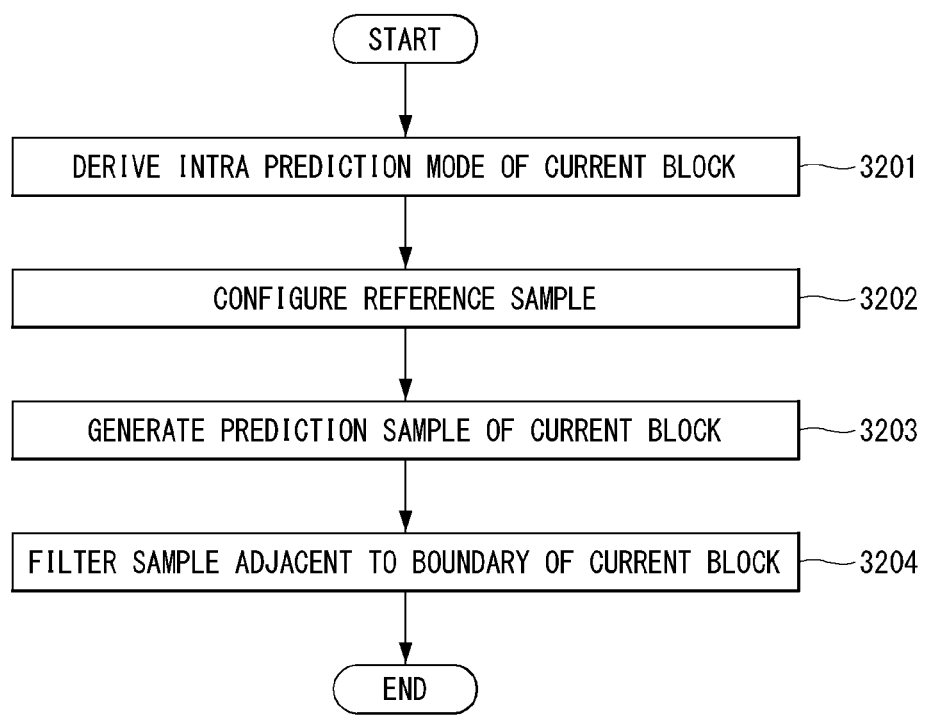

[FIG. 33]
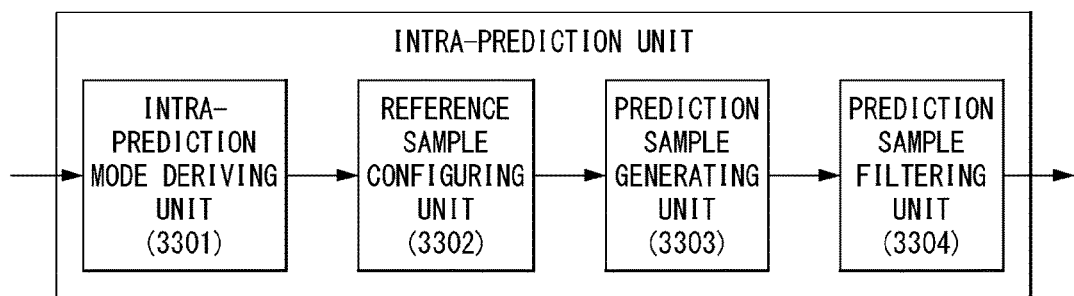

IMAGE CODING/DECODING METHOD AND APPARATUS THEREFOR

CROSS-REFERENCE TO RELATED APPLICATIONS

This application is a Continuation of U.S. patent application Ser. No. 16/330,329, filed on Mar. 4, 2019, which is a National Stage filing under 35 U.S.C. 371 of International Application No. PCT/KR2017/009705, filed on Sep. 5, 2017, which claims the benefit of U.S. Provisional Application No. 62/383,589, filed on Sep. 5, 2016 the contents of which are all hereby incorporated by reference herein in their entirety.

TECHNICAL FIELD

The present invention relates to a still image or moving image processing method, and more particularly, to a method for filtering a prediction sample which is intra predicted and an apparatus for supporting the same.

BACKGROUND ART

Compression encoding means a series of signal processing techniques for transmitting digitized information through a communication line or techniques for storing information in a form suitable for a storage medium. The medium including a picture, an image, audio, etc. may be a target for compression encoding, and particularly, a technique for performing compression encoding on a picture is referred to as video image compression.

Next-generation video contents are supposed to have the characteristics of high spatial resolution, a high frame rate and high dimensionality of scene representation. In order to process such contents, a drastic increase in the memory storage, memory access rate and processing power will result.

Accordingly, it is required to design a coding tool for processing next-generation video contents efficiently.

DISCLOSURE

Technical Problem

The present invention proposes a method for adaptively filtering a boundary pixel of a prediction block according to a prediction direction in a quad-tree binary-tree (QTBT) block partitioning structure when performing an intra-picture prediction (intra prediction).

The technical objects of the present invention are not limited to the aforementioned technical objects, and other technical objects, which are not mentioned above, will be apparently appreciated by a person having ordinary skill in the art from the following description.

Technical Solution

In an aspect, a method for decoding an image by a decoding apparatus may include: deriving an intra prediction mode of a current block; configuring reference samples with samples neighboring to an upper end and samples neighboring to a left side of the current block; generating a prediction block of the current block by using the reference sample; and filtering a sample adjacent to a top boundary and/or a left boundary of the current block among the prediction samples, in which when the current block is a non-square block, whether to filter the sample adjacent to the top boundary of the current block may be determined by considering only a width of the current block and whether to filter the sample adjacent to the left boundary of the current block may be determined by considering only a height of the current block.

In another aspect, a method for decoding an image by a decoding apparatus may include: an intra prediction mode deriving unit deriving an intra prediction mode of a current block; a reference sample configuring unit configuring reference samples with samples neighboring to an upper end and samples neighboring to a left side of the current block; a prediction sample generating unit generating a prediction block of the current block by using the reference sample; and a prediction sample filtering unit filtering a sample adjacent to a top boundary and/or a left boundary of the current block among the prediction samples, in which when the current block is a non-square block, whether to filter the sample adjacent to the top boundary of the current block may be determined by considering only a width of the current block and whether to filter the sample adjacent to the left boundary of the current block may be determined by considering only a height of the current block.

Preferably, when the intra prediction mode of the current block is a DC mode, filtering of the sample adjacent to the top boundary of the current block may be performed when the width of the current block is equal to or less than a predetermined size, and filtering of the sample adjacent to the left boundary of the current block may be performed when the height of the current block is equal to or less than a predetermined size.

Preferably, when a directionality of the intra prediction mode of the current block is within a predetermined range based on a horizontal intra prediction mode, the filtering of the sample adjacent to the top boundary of the current block may be performed when the height of the current block is equal to or less than the predetermined size.

Preferably, when the directionality of the intra prediction mode of the current block is within a predetermined range based on a vertical intra prediction mode, the filtering of the sample adjacent to the left boundary of the current block may be performed when the width of the current block is equal to or less than the predetermined size.

Preferably, when the intra prediction mode of the current block is 2nd mode in an intra prediction mode method in which a total of 67 intra prediction modes are defined, the filtering of the sample adjacent to the top boundary of the current block may be performed when the width of the current block is equal to or less than the predetermined size.

Preferably, when the height of the current block is more than 4, samples which belong to four lines adjacent to the top boundary of the current block may be filtered.

Preferably, when the height of the current block is not more than 4, only samples which belong to two lines adjacent to the top boundary of the current block may be filtered.

Preferably, when the intra prediction mode of the current block is 66th mode in the intra prediction mode method in which a total of 67 intra prediction modes are defined, the filtering of the sample adjacent to the left boundary of the current block may be performed when the height of the current block is equal to or less than the predetermined size.

Preferably, when the width of the current block is more than 4, samples which belong to four lines adjacent to the left boundary of the current block may be filtered.

Preferably, when the width of the current block is not more than 4, only samples which belong to two lines adjacent to the left boundary of the current block may be filtered.

Advantageous Effects

According to an embodiment of the present invention, compression performance can be enhanced by adaptively filtering a boundary pixel of a prediction block according to a prediction direction in the process of predicting a still image or a moving image with an intra-picture prediction.

Furthermore, according to the embodiment of the present invention, the existing block boundary filtering method can be more efficiently applied in a quad-tree binary-tree (QTBT) block partitioning structure.

Furthermore, according to the embodiment of the present invention, a post-filter (or in-roof filter) can be effectively performed in a quad-tree binary-tree (QTBT) structure by adaptively filtering the boundary pixel of the prediction block according to the prediction direction when performing the intra-picture prediction (intra prediction).

Advantages which can be obtained in the present invention are not limited to the aforementioned effects and other unmentioned advantages will be clearly understood by those skilled in the art from the following description.

DESCRIPTION OF DRAWINGS

The accompanying drawings, which are included herein as a part of the description for help understanding the present invention, provide embodiments of the present invention, and describe the technical features of the present invention with the description below.

FIG. 1 shows a block diagram of an encoder which performs encoding of a video signal according to an embodiment of the present invention.

FIG. 2 shows a block diagram of a decoder which performs decoding of a video signal according to an embodiment of the present invention.

FIGS. 3a and 3b show a partitioning structure of a coding unit according to an embodiment of the present invention.

FIG. 4 shows a quad-tree plus binary-tree structure among partitioning structures of a coding unit according to an embodiment of the present invention.

FIGS. 5a and 5b illustrate a prediction direction depending on an intra prediction mode according to an embodiment of the present invention.

FIG. 6 illustrates a prediction direction generated through an intra prediction according to an embodiment of the present invention.

FIGS. 7 and 8 are diagrams for describing filtering of a boundary pixel of a prediction block when the intra prediction mode is a DC mode according to an embodiment of the present invention.

FIGS. 9a to 9c are diagrams for describing the filtering of the boundary pixel of the prediction block when the intra prediction mode is a horizontal mode according to an embodiment of the present invention.

FIGS. 10a to 10c are diagrams for describing the filtering of the boundary pixel of the prediction block when the intra prediction mode is a vertical mode according to an embodiment of the present invention.

FIGS. 11 to 13 are diagrams for describing filtering of a boundary pixel of a prediction block when the intra prediction mode is 2nd mode according to an embodiment of the present invention.

FIGS. 14 to 16 are diagrams for describing the filtering of the boundary pixel of the prediction block when the intra prediction mode is 34th mode among 35 intra prediction modes or prediction 67th mode among 67 intra prediction modes according to an embodiment of the present invention.

FIGS. 17a to 17d are diagrams for describing the filtering of the boundary pixel of the prediction block when the intra prediction mode is 3rd, 4th, 5th or 6th mode among 35 intra prediction modes according to an embodiment of the present invention.

FIGS. 18a to 18d are diagrams for describing the filtering of the boundary pixel of the prediction block when the intra prediction mode is 30th, 31th, 32th, or 33th mode among 35 intra prediction modes according to an embodiment of the present invention.

FIGS. 19 and 20 are diagrams for describing the filtering of the boundary pixel of the prediction block when the intra prediction mode is 3rd, 4th, 5th, 6th, 7th, 8th, 9th, or 10th mode among 67 intra prediction modes according to an embodiment of the present invention.

FIGS. 21 and 22 are diagrams for describing the filtering of the boundary pixel of the prediction block when the intra prediction mode is 59th, 60th, 61th, 62th, 63th, 64th, 65th, or 66th mode among 67 intra prediction modes according to an embodiment of the present invention.

FIG. 23 illustrates a process of filtering a boundary pixel of a prediction block in a QTBT structure according to an embodiment of the present invention.

FIG. 24 illustrates a predictor filtering process in the QTBT structure according to an embodiment of the present invention.

FIG. 25 is a diagram illustrating a method for filtering a boundary pixel when an intra prediction mode is a DC mode according to an embodiment of the present invention.

FIG. 26 is a diagram illustrating a boundary pixel filtering process when the intra prediction mode is a horizontal/vertical mode according to an embodiment of the present invention.

FIG. 27 is a diagram illustrating a method for filtering a boundary pixel of a prediction block according to an embodiment of the present invention.

FIGS. 28 and 29 are diagrams illustrating a method for filtering a boundary pixel of a prediction block according to an embodiment of the present invention.

FIG. 30 is a diagram illustrating a method for filtering a boundary pixel of a prediction block according to an embodiment of the present invention.

FIG. 31 is a diagram illustrating a method for filtering a boundary pixel of a prediction block according to an embodiment of the present invention.

FIG. 32 is a diagram illustrating an inter prediction method according to an embodiment of the present invention.

FIG. 33 is a diagram more specifically illustrating an inter prediction unit according to an embodiment of the present invention.

MODE FOR INVENTION

Hereinafter, a preferred embodiment of the present invention will be described by reference to the accompanying drawings. The description that will be described below with the accompanying drawings is to describe exemplary embodiments of the present invention, and is not intended to describe the only embodiment in which the present invention may be implemented. The description below includes particular details in order to provide perfect understanding of the present invention. However, it is understood that the present invention may be embodied without the particular details to those skilled in the art.

In some cases, in order to prevent the technical concept of the present invention from being unclear, structures or devices which are publicly known may be omitted, or may be depicted as a block diagram centering on the core functions of the structures or the devices.

Further, although general terms widely used currently are selected as the terms in the present invention as much as possible, a term that is arbitrarily selected by the applicant is used in a specific case. Since the meaning of the term will be clearly described in the corresponding part of the description in such a case, it is understood that the present invention will not be simply interpreted by the terms only used in the description of the present invention, but the meaning of the terms should be figured out.

Specific terminologies used in the description below may be provided to help the understanding of the present invention. Furthermore, the specific terminology may be modified into other forms within the scope of the technical concept of the present invention. For example, a signal, data, a sample, a picture, a frame, a block, etc. may be properly replaced and interpreted in each coding process.

In the present description, "block" or "unit" refers to a unit of performing an encoding/decoding process such as prediction, transformation and/or quantization and may be composed of multi-dimension arrangement of samples (or pixels).

"Block" or "unit" may refer to multi-dimension arrangement of samples with respect to a luma component or multi-dimension arrangement of samples with respect to a chroma component. In addition, "block" or "unit" may commonly refer to multi-dimension arrangement of samples with respect to a luma component and multi-dimension arrangement of samples with respect to a chroma component.

For example, "block" or "unit" can be interpreted as the meaning including a coding block (CB) which refers to arrangement of samples to be encoded/decoded, a coding tree block (CTB) composed of a plurality of coding blocks, a prediction block (PB) (or prediction unit (PU)) which refers to arrangement of samples to which the same prediction is applied, and a transform block (TB) (or transform unit (TU)) which refers to arrangement of samples to which the same transformation is applied.

Furthermore, "block" or "unit" may be interpreted as the meaning including a syntax structure used in a process of encoding/decoding arrangement of samples with respect to a luma component and/or a chroma component unless otherwise mentioned. Here, the syntax structure refers to 0 or more syntax elements present in a bitstream in a specific order, and a syntax element refers to a data element represented in a bitstream.

For example, "block" or "unit" can be interpreted as the meaning including a coding unit (CU) including a coding block and a syntax structure used for encoding of the coding block, a coding tree unit composed of a plurality of coding units, a prediction unit (PU) including a prediction block and a syntax structure used for prediction of the prediction block, and a transform unit (TU) including a transform block and a syntax structure used for transformation of the transform block.

In addition, in the present description, "block" or "unit" is not limited to arrangement of samples (or pixels) in a square or rectangular form and may refer to arrangement of samples (or pixels) in a polygonal form having three or more vertexes. In this case, it may be referred to as a polygon block or a polygon unit.

FIG. 1 shows a block diagram of an encoder which performs encoding of a video signal according to an embodiment of the present invention.

Referring to FIG. 1, an encoder 100 comprises a picture partitioning unit 110, transform unit 130, dequantization unit 140, inverse transform unit 150, filtering unit 160, decoded picture buffer (DPB) 170, inter-prediction unit 180, intra-prediction unit 185, and entropy encoding unit 190.

The picture partitioning unit 110 may partition an input image (or picture or frame) fed into the encoder into one or more processing units. For example, the processing unit may be a coding tree unit (CTU), coding unit (CU), prediction unit (PU), or transform unit (TU).

The encoder 100 may generate a residual signal by subtracting, from the input image signal, a prediction signal output from the inter-prediction unit 180 or intra-prediction unit 185, after which the generated residual signal is fed to the transform unit 120.

The transform unit 120 may generate transform coefficients by applying a transform technique to the residual signal. For example, the transform technique may include at least one of Discrete Cosine Transform (DCT), Discrete Sine Transform (DST), Karhunen-Loève Transform (KLT), Graph-Based Transform (GBT), or Conditionally Non-linear Transform (CNT). Here, GBT means a transform obtained from a graph representing information about relations among pixels. CNT means a transform obtained based on a prediction signal generated by using all of previously reconstructed pixels. Also, the transform process may be applied to square pixel blocks of the same size or non-square blocks of variable size.

The quantization unit 130 may quantize the transform coefficients and outputs the quantized transform coefficients to the entropy encoding unit 190, where the quantized signal is entropy-coded and output as a bitstream.

A quantized signal output from the quantization unit 130 may be used to generate a prediction signal. For example, a residual signal may be reconstructed by applying dequantization and inverse transform to the quantized signal through the dequantization unit 140 and the inverse transform unit 150 inside the loop. A reconstructed signal may be generated by adding the reconstructed residual signal to the prediction signal output from the inter-prediction unit 180 or intra-prediction unit 185.

The filtering unit 160 applies filtering to the reconstructed signal and outputs or transmits the filtered reconstructed signal to a playback device or the decoded picture buffer 170. A filtered signal output to the decoded picture buffer 170 may be used as a reference picture in the inter-prediction unit 180. In this manner, not only the image quality but also the coding efficiency may be improved by using the filtered picture as a reference picture in the intra-frame prediction mode.

The decoded picture buffer 170 may store a filtered picture to use it as a reference picture in the inter-prediction unit 180.

The inter-prediction unit 180 performs temporal and/or spatial prediction with reference to a reconstructed picture to remove temporal and/or spatial redundancy.

The intra-prediction unit 185 may predict a current block by referencing samples in the surroundings of the current block to be coded. The intra-prediction unit 185 may perform the following process to perform intra-prediction. First, the intra-prediction unit 185 may prepare reference samples to generate a prediction signal. And a prediction signal may be generated by using the prepared reference samples. Afterwards, the prediction mode is encoded. At this time, reference samples may be prepared through reference sample padding and/or reference sample filtering. Since a reference sample undergoes a prediction and reconstruction processes, a quantization error may exist. Therefore, to reduce the error, a reference sample filtering process may be performed in each prediction mode used for intra-prediction.

The prediction signal generated through the inter-prediction unit 180 or the intra-prediction unit 185 may be used for generating a reconstruction signal or a residual signal.

FIG. 2 shows a block diagram of a decoder which performs decoding of a video signal according to an embodiment of the present invention.

With reference to FIG. 2, a decoder 200 may comprise an entropy decoding unit 210, dequantization unit 220, inverse transform unit 230, filtering unit 240, decoded picture buffer (DPB) unit 250, inter-prediction unit 260, and intra-prediction unit 265.

And a reconstructed image signal output through the decoder 200 may be played by a playback device.

The decoder 200 may receive a signal output from the encoder 100 of FIG. 1, where a received signal may be entropy-decoded through the entropy decoding unit 210.

The dequantization unit 220 obtains transform coefficients from the entropy-decoded signal by using quantization step size information.

The inverse transform unit 230 obtains a residual signal by inversely transforming the transform coefficients.

The obtained residual signal is added to a prediction signal output from the inter-prediction unit 260 or intra-prediction unit 265, by which a reconstructed signal is generated.

The filtering unit 240 applies filtering to the reconstructed signal and outputs the filtered reconstructed signal to a playback device or transmit the filtered reconstructed signal to the decoded picture buffer (DPB) unit 250. The filtered signal fed to the DPB unit 250 may be used as a reference picture by the inter-prediction unit 260.

In the present specification, embodiments described with reference to the filtering unit 260, inter-prediction unit 180, and intra-prediction unit 185 of the encoder 100 may be applied in the same way to the filtering unit 240, inter-prediction unit 260, and intra-prediction unit 265 of the decoder, respectively.

Image Partitioning

FIGS. 3a and 3b show a partitioning structure of a coding unit according to an embodiment of the present invention.

The encoder may partition one image (or picture) into coding tree units (CTUs) of rectangular shape. And the encoder encodes the CTUs one after the other according to a raster scan order.

One CTU may be decomposed into a quadtree (hereinafter, it is denoted as 'QT') structure. For example, one CTU may be subdivided into four square-shaped units, where the edge length of each unit is one-half of the corresponding edge of CTU. Such partitioning in a QT structure may be performed recursively.

Referring to FIGS. 3a and 3b, the root note of the QT may be associated with a CTU. A QT may be decomposed until it reaches leaf nodes, where, at this time, the leaf node may be referred to as a coding unit (CU).

Referring to FIGS. 3a and 3b, a CTU corresponds to the root node and has the smallest depth value (i.e., level 0). Depending on the characteristics of an image, a CTU may not be subdivided, for which case the CTU corresponds to the CU.

A CTU may be subdivided in a QT structure and as a result, child nodes having a depth of level 1 may be generated. A node which is no longer subdivided from the child node at the depth of level 1 (i.e., a leaf node) corresponds to a CU. For example, in FIG. 3b, CU(a), CU(b), and CU(j) corresponding to node a, b, and j have been subdivided from the CTU once and have a depth of level 1.

For each CU, information indicating whether the corresponding CU is subdivided may be transmitted to the decoder. For example, the information may be defined by a split flag, which may be expressed by a syntax element "split_cu_flag". The split flag may be included in all of the CUs except for an SCU. For example, if the split flag is '1', the corresponding CU is further subdivided into four CUs whereas, if the split flag is '0', the corresponding CU is no longer subdivided, and a coding process may be performed on the corresponding CU.

Although the embodiment of FIGS. 3a and 3b describes a process for subdividing a CU, the same QT structure described in detail above may also be applied to the process of subdividing a transform unit (TU) which is a basic unit for performing transform.

A TU may be subdivided hierarchically in the QT structure from a CU to be coded. For example, a CU may correspond to the root node of a tree associated with the TU.

Since a TU is subdivided in the QT structure, a TU subdivided from a CU may be further subdivided into smaller Tus. For example, the size of a TU may be determined by one of 32×32, 16×16, 8×8, and 4×4; however, the present invention is not limited to the specific example, and in the case of a high-resolution image, the size of a TU may be increased or have various values.

For each TU, information indicating whether the corresponding TU is subdivided may be transmitted to the decoder. For example, the information may be defined by a split transform flag, which may be expressed by a syntax element "split_transform_flag".

As described above, a CU is a basic unit for coding, by which intra-prediction or inter-prediction is performed. To perform coding of an input image more efficiently, a CU may be subdivided into prediction units (PUs).

A PU is a basic unit for generating a prediction block which may be generated differently in terms of PUs even within one CU. PUs may be subdivided differently from a CU depending on whether the intra-prediction mode or inter-prediction mode is used for the coding mode of the CU.

FIG. 4 shows a quad-tree plus binary-tree structure among partitioning structures of a coding unit according to an embodiment of the present invention.

The encoder may partition one image (or picture) into coding tree units (CTUs) of rectangular shape. And the encoder encodes the CTUs one after the other according to a raster scan order.

One CTU may be decomposed into a quadtree (hereinafter, it is denoted as 'QT') and binarytree (hereinafter, it is denoted as 'BT') structure. For example, one CTU may be subdivided into four square-shaped units, where the edge length of each unit is one-half of the corresponding edge of CTU or may be subdivided into two rectangular units, where width or height of each unit is one-half of the corresponding CTU. Such partitioning in a QTBT structure may be performed recursively.

Referring to FIG. 4, the root note of the QT may be associated with a CTU. A QT may be decomposed until it reaches QT leaf nodes, where a QT leaf node may be subdivided into a BT which may be further subdivided until BT leaf nodes are reached.

Referring to FIG. 4, a CTU corresponds to the root node and has the smallest depth value (i.e., level 0). Depending on the characteristics of an image, a CTU may not be subdivided, for which case the CTU corresponds to the CU.

A CTU may be subdivided in a QT structure, and a QT leaf node may be subdivided in a BT structure. As a result, child nodes having a depth of level n may be generated. And A node which is no longer subdivided from the child node at the depth of level n (i.e., a leaf node) corresponds to a CU.

For each CU, information indicating whether the corresponding CU is subdivided may be transmitted to the decoder. For example, the information may be defined by a split flag, which may be expressed by a syntax element "split_cu_flag". Also, information indicating whether a QT leaf node is subdivided into a BT may be transmitted to the decoder. For example, the information may be defined by a BT split flag, which may be expressed by a syntax element "bt_split_flag". In addition, when a QT leaf node is subdivided into a BT by the split_bt_flag, a BT subdivision shape may be transmitted to the decoder so that the region corresponding to the QT leaf node is subdivided into rectangles the width of which is one-half of the width of the region or rectangles the height of which is one-half of the height of the region. For example, the information may be defined by a BT split mode, which may be expressed by "bt_split_mode".

Intra Prediction

FIGS. 5a and 5b illustrate a prediction direction depending on an intra prediction mode according to an embodiment of the present invention.

FIG. 5a illustrates 35 intra prediction modes.

Table 1 shows names of 35 intra prediction modes illustrated in FIG. 5a.

TABLE 1

| Intra prediction mode | Associated name |
| --- | --- |
| 0 | INTRA_PLANAR |
| 1 | INTRA_DC |
| 2 . . . 34 | INTRA_ANGULAR2 . . . INTRA_ANGULAR34 |

FIG. 5b illustrates 67 intra prediction modes.

For intra encoding of a high-resolution image and more accurate prediction, 35 angular modes are extended to 67 angular modes. An arrow indicated by dotted liens in FIG. 5b indicates newly added 32 angular modes. An INTRA_PLANAR mode and an INTRA_DC mode are the same as the existing intra planar mode and intra DC mode. All of the newly added 32 directional modes are applied and further, all applied in intra encoding of a luminance component and a chrominance component.

Table 2 shows names of 67 intra prediction modes illustrated in FIG. 5b.

TABLE 2

| Intra prediction mode | Associated name |
| --- | --- |
| 0 | INTRA_PLANAR |
| 1 | INTRA_DC |
| 2 . . . 66 | INTRA_ANGULAR2 . . . INTRA_ANGULAR66 |

In the intra prediction, a prediction direction for a location of a reference sample used for prediction may be provided according to the prediction mode. In this specification, the intra prediction mode having the prediction direction is referred to as an Intra-Angular prediction mode or an Intra_Angular mode. On the contrary, the intra prediction mode which does not the prediction direction includes the INTRA_PLANAR prediction mode and the INTRA_DC prediction mode.

In the intra prediction, a current processing block is performed based on a derived prediction mode. Since the reference sample used for the prediction and a concrete prediction method are changed depending on the prediction mode, when a current block is encoded in the intra prediction mode, a decoder may derive the prediction mode of the current block in order to perform the prediction.

The decoder may check whether neighboring samples of the current processing block may be used for the prediction and configure reference samples to be used for the prediction.

The neighboring samples of the current processing block in the intra prediction mean samples adjacent to a left boundary of a current processing block having a size of nS×nS and a total of 2×ns samples neighboring to a bottom-left side, a sample adjacent to a top boundary of the current processing block and a total of 2×ns samples neighboring to a top-right side, and one sample neighboring to a top-left side of the current processing block.

However, some of the neighboring samples of the current processing block may not yet be decoded or may not be available. In this case, the decoder may configure the reference samples to be used for the prediction by substituting samples which are not available as the available samples.

The decoder may filter the reference sample based on the intra prediction mode.

The decoder may generate the prediction block for the current processing block based on the intra prediction mode and the reference samples. That is, the decoder may generate the prediction block for the current processing block based on the intra prediction mode derived in the intra prediction mode deriving step and the reference samples acquired through the reference sample configuring step and the reference sample filtering step.

Reference Sample Filtering

The encoder/decoder filters a boundary pixel of the prediction block according to the prediction direction in the process of an intra picture prediction (i.e., intra prediction).

Hereinafter, a method for filtering a block boundary pixel of the prediction block in the process of HEVC intra picture prediction and a method for filtering the block boundary pixel of the prediction block in a current QTBT structure will be described.

Hereinafter, for convenience of description, a coordinate of a pixel are represented by (x, y), where it is assumed that x indicates the coordinate (the value increases from the left to the right) of an x axis in a horizontal direction and y indicates the coordinate (the value increases from the top to the bottom) of a y axis in a vertical direction. Further, the coordinate of a top-left pixel in the prediction block is assumed as (0, 0).

Further, hereinafter, in this specification, for convenience of description, a boundary pixel filtering method in an intra prediction method having 35 intra prediction modes and/or 67 intra prediction modes is described, but the present invention is not limited thereto and the intra prediction mode may be similarly applied even to the intra prediction method defined differently therefrom.

FIG. 6 illustrates a prediction direction generated through an intra prediction according to an embodiment of the present invention.

In FIG. 6, a white dotted line block represents a reference pixel (i.e., reference sample) and a gray solid line block (i.e., predictor).

Hereinafter, for convenience of description, the boundary pixel filtering according to the intra prediction mode of HEVC and QTBT will be described.

First, when the intra prediction mode is a DC mode, a filtering method of a boundary pixel of the prediction block will be described.

FIGS. 7 and 8a-8d are diagrams for describing filtering of a boundary pixel of a prediction block when the intra prediction mode is a DC mode according to an embodiment of the present invention.

In FIG. 7 and FIGS. 8a-8d, a dark gray solid line block indicates a filtered prediction block (i.e., a filtered predictor) and as illustrated in FIG. 7, in the case of the DC mode, pixels of left and top block boundaries are filtered.

FIGS. 8a and 9b illustrate a method for filtering the pixel of the top block boundary in the case of the DC mode.

As illustrated in FIG. 8a, a pixel 801a on the top block boundary is filtered using a prediction pixel and a reference pixel.

In addition, the reference pixel and the prediction pixel used for filtering are determined according to a position of each pixel of the pixel 801a on the top block boundary as illustrated in FIG. 8b.

That is, the value of the filtered pixel (i.e., predictor) (x, y) on the top block boundary is calculated as {(3×the value of a prediction pixel (i.e., predictor) (x, y)+the value of a reference pixel (x, y−1)+2)>>2}.

Hereinafter, in this specification, x>>y means an arithmetic right shift in which a two's complement integer expression of x is calculated by a y binary digit. The function is defined only for a non-negative integer value of y. The bit shifted to the most significant bit (MSB) as a result of the right shift has the same value as the most significant bit (MSB) of x before the shift operation.

FIGS. 8c and 8d illustrate a method for filtering the pixel of the left block boundary in the case of the DC mode.

As illustrated in FIG. 8c, a pixel 801c at the left block boundary is filtered using the prediction pixel and the reference pixel.

In addition, the reference pixel and the prediction pixel used for filtering are determined according to the position of each pixel of the pixel 801c on the left block boundary as illustrated in FIG. 8d.

That is, the value of the filtered pixel (i.e., predictor) (x, y) on the left block boundary is calculated as {(3×the value of a prediction pixel (i.e., predictor) (x, y)+the value of a reference pixel (x−, y)+2)>>2}.

Next, when the intra prediction mode is a horizontal mode, the filtering method of the boundary pixel of the prediction block will be described.

FIGS. 9a to 9c are diagrams for describing the filtering of the boundary pixel of the prediction block when the intra prediction mode is a horizontal mode according to an embodiment of the present invention.

FIGS. 9a to 9c illustrate block boundary filtering when a prediction block is generated in the 10th prediction mode in the intra prediction method having 35 intra prediction modes such as HEVC or 18th, 19th and 17th prediction modes in the intra prediction method having 67 intra prediction modes (see FIGS. 5a and 5b above).

As can be seen from FIG. 9a, since 10th mode of HEVC or 17th, 18th, and 19th mode of 67 prediction modes are horizontal prediction modes (see FIGS. 5a and 5b above), a pixel 901a of the top block boundary is filtered.

In addition, the reference pixel and the prediction pixel used for filtering are determined according to the position of each pixel of the pixel 901a on the top block boundary as illustrated in FIGS. 9b and 9c.

That is, the value of the filtered pixel (i.e., predictor) (x, y) on the top block boundary is calculated as {the value of a prediction pixel (x, y)+(the value of a first reference pixel (−1, −1)—the value of a second reference pixel (x, y−1)>>1)}.

Next, when the intra prediction mode is a vertical mode, the filtering method of the boundary pixel of the prediction block will be described.

FIGS. 10a to 10c are diagrams for describing the filtering of the boundary pixel of the prediction block when the intra prediction mode is a vertical mode according to an embodiment of the present invention.

FIGS. 10a to 10c illustrate block boundary filtering when a prediction block is generated in the 26th prediction mode in the intra prediction method having 35 intra prediction modes such as HEVC or 49th, 50th, 51th prediction modes in the intra prediction method having 67 intra prediction modes.

As can be seen from FIG. 10a, since 26th mode of HEVC or 49th, 50th and 51 the modes of 67 prediction modes are vertical prediction modes (see FIGS. 5a and 5b above), a pixel 1001a of the left block boundary is filtered.

In addition, the reference pixel and the prediction pixel used for filtering are determined according to the position of each pixel of the pixel 1001a on the left block boundary as illustrated in FIGS. 10b and 10c.

That is, the value of the filtered pixel (i.e., predictor) (x, y) on the left block boundary is calculated as {the value of the prediction pixel (x, y)+(the value of the first reference pixel (−1, −1)—the value of the second reference pixel (x−1, y)>>1)}.

In the case of the horizontal or vertical prediction mode described above with reference to FIGS. 9a-9c and 10a-10c, the pixel of the prediction block boundary may be filtered only on a block whose size of the prediction block is a specific size or less (for example, 16×16 or less).

Next, when the intra prediction mode is 2nd mode (for example, among 35 or 67 intra prediction modes as illustrated in FIGS. 5a and 5b above), the filtering method of the boundary pixel of the prediction block will be described.

FIGS. 11 to 13 are diagrams for describing filtering of a boundary pixel of a prediction block when the intra prediction mode is 2nd mode according to an embodiment of the present invention.

As illustrated in FIG. 11, when the intra prediction mode is 2nd mode, since the prediction is performed from the bottom-left reference pixel, filtering is performed with respect to four top prediction pixel lines.

As illustrated in FIGS. 12a and 12b, the reference pixel and the prediction pixel used for filtering are determined according to the position of each pixel of a pixel 1201a of a first prediction pixel line from an uppermost end.

That is, the value of the filtered pixel (x, y) of the first prediction pixel line is calculated as {(8×the value of the prediction pixel (x, y)+8×the value of a reference pixel (x+1, y−1)+8)>>4}.

As illustrated in FIGS. 12c and 12d, the reference pixel and the prediction pixel used for filtering are determined according to the position of each pixel of a pixel 1201c of a second prediction pixel line from the uppermost end.

That is, the value of the filtered pixel (x, y) of the second prediction pixel line is calculated as {(12×the value of the prediction pixel (x, y)+4×the value of a reference pixel (x+2, y−2)+8)>>4}.

As illustrated in FIGS. 13a and 13b, the reference pixel and the prediction pixel used for filtering are determined according to the position of each pixel of a pixel 1301a of a third prediction pixel line from the uppermost end.

That is, the value of the filtered pixel (x, y) of the third prediction pixel line is calculated as {(14×the value of the prediction pixel (x, y)+2×the value of a reference pixel (x+3, y−3)+8)>>4}.

As illustrated in FIGS. 13c and 13d, the reference pixel and the prediction pixel used for filtering are determined according to the position of each pixel of a pixel 1301c of a fourth prediction pixel line from the uppermost end.

That is, the value of the filtered pixel (x, y) of the fourth prediction pixel line is calculated as {(14×the value of the prediction pixel (x, y)+8×the value of a reference pixel (x+4, y−4)+8)>>4}.

Next, when the intra prediction mode is 34th mode (for example, among 35 intra prediction modes as illustrated in FIGS. 5a and 5b above), the filtering method of the boundary pixel of the prediction block will be described.

FIGS. 14 to 16 are diagrams for describing the filtering of the boundary pixel of the prediction block when the intra prediction mode is mode #34 among 35 intra prediction modes or prediction mode #66 among 67 intra prediction modes according to an embodiment of the present invention.

As illustrated in FIG. 14, in the case where the intra prediction mode is 34th mode (in the case of 35 intra prediction modes) or 66th mode (in the case of 67 intra prediction modes), since the prediction is performed from the top right reference pixel, the filtering is performed with respect to four left prediction pixel lines.

As illustrated in FIGS. 15a and 15b, the reference pixel and the prediction pixel used for filtering are determined according to the position of each pixel of a pixel 1501a of a first prediction pixel line from a leftmost side.

That is, the value of the filtered pixel (x, y) of the first prediction pixel line is calculated as {(8×the value of the prediction pixel (x, y)+8×the value of a reference pixel (x−1, y+1)+8)>>4}.

As illustrated in FIGS. 15c and 15d, the reference pixel and the prediction pixel used for filtering are determined according to the position of each pixel of a pixel 1501c of a second prediction pixel line from the leftmost side.

That is, the value of the filtered pixel (x, y) of the second prediction pixel line is calculated as {(12×the value of the prediction pixel (x, y)+4×the value of a reference pixel (x−2, y+2)+8)>>4}.

As illustrated in FIGS. 16a and 16b, the reference pixel and the prediction pixel used for filtering are determined according to the position of each pixel of a pixel 1601a of a third prediction pixel line from the leftmost side.

That is, the value of the filtered pixel (x, y) of the third prediction pixel line is calculated as {(14×the value of the prediction pixel (x, y)+2×the value of a reference pixel (x−3, y+3)+8)>>4}.

As illustrated in FIGS. 16c and 16d, the reference pixel and the prediction pixel used for filtering are determined according to the position of each pixel of a pixel 1601c of a fourth prediction pixel line from the leftmost side.

That is, the value of the filtered pixel (x, y) of the fourth prediction pixel line is calculated as {(15×the value of the prediction pixel (x, y)+8×the value of a reference pixel (x−4, y+4)+8)>>4}.

Next, when the intra prediction mode is 3rd, 4th, 5th, or 6th mode or 30th, 31th, 32th, or 33th mode (for example, among 35 intra prediction modes as illustrated in FIGS. 5a and 5b above), the filtering method of the boundary pixel of the prediction block will be described.

FIGS. 17a to 17d are diagrams for describing the filtering of the boundary pixel of the prediction block when the intra prediction mode is 3rd, 4th, 5th or 6th mode among 35 intra prediction modes according to an embodiment of the present invention.

Since intra prediction 3rd, 4th, 5th or 6th mode is a mode to perform the prediction from the left reference sample, the filtering is performed on the top boundary pixel of the prediction block and there is a difference between the position of the reference pixel used for filtering and the weight of the reference pixel and the prediction pixel according to an angle (i.e., an angle of a prediction direction of each mode.

FIG. 17a illustrates filtering for the boundary pixel of the prediction block in the case of intra prediction 3rd mode.

As illustrated in FIG. 17a, the position of the reference pixel used for filtering is determined according to the position of each pixel of a pixel 1701a of a top block boundary.

That is, the value of the filtered pixel (x, y) on the top block boundary is calculated as {(8×the value of the prediction pixel (x, y)+6×the value of the first reference pixel (x+1, y−1)+2×the value of the second reference pixel (x+2, y−1)+8)>>4}.

FIG. 17b illustrates filtering for the boundary pixel of the prediction block in the case of intra prediction mode #4.

As illustrated in FIG. 17b, the position of the reference pixel used for filtering is determined according to the position of each pixel of a pixel 1701b of the top block boundary.

That is, the value of the filtered pixel (x, y) on the top block boundary is calculated as {(12×the value of the prediction pixel (x, y)+2×the value of the first reference pixel (x+1, y−1)+2×the value of the second reference pixel (x+2, y−1)+8)>>4}.

FIG. 17c illustrates filtering for the boundary pixel of the prediction block in the case of intra prediction 5th mode.

As illustrated in FIG. 17c, the position of the reference pixel used for filtering is determined according to the position of each pixel of a pixel 1701c of the top block boundary.

That is, the value of the filtered pixel (x, y) on the top block boundary is calculated as {(12×the value of the prediction pixel (x, y)+1×the value of the first reference pixel (x+1, y−1)+3×the value of the second reference pixel (x+2, y−1)+8)>>4}.

FIG. 17d illustrates filtering for the boundary pixel of the prediction block in the case of intra prediction 6th mode.

As illustrated in FIG. 17d, the position of the reference pixel used for filtering is determined according to the position of each pixel of a pixel 1701d of the top block boundary.

That is, the value of the filtered pixel (x, y) on the top block boundary is calculated as {(12×the value of the prediction pixel (x, y)+3×the value of the first reference pixel (x+2, y−1)+1×the value of the second reference pixel (x+3, y−1)+8)>>4}.

FIGS. 18a to 18d are diagrams for describing the filtering of the boundary pixel of the prediction block when the intra prediction mode is 30th, 31th, 32th, or 33th mode among 35 intra prediction modes according to an embodiment of the present invention.

Since intra prediction 30th, 31th, 32th, or 33th mode is a mode to perform the prediction from the top reference sample, the filtering is performed on the left boundary pixel of the prediction block and there is a difference between the position of the reference pixel used for filtering and the weight of the reference pixel and the prediction pixel according to an angle (i.e., an angle of a prediction direction of each mode.

FIG. 18a illustrates filtering for the boundary pixel of the prediction block in the case of intra prediction mode #30.

As illustrated in FIG. 18a, the position of the reference pixel used for filtering is determined according to the position of each pixel of a pixel 1801a of the left block boundary.

That is, the value of the filtered pixel (x, y) on the left block boundary is calculated as {(8×the value of the prediction pixel (x, y)+6×the value of the first reference pixel (x−1, y+1)+2×the value of the second reference pixel (x−2, y+2)+8)>>4}.

FIG. 18b illustrates filtering for the boundary pixel of the prediction block in the case of intra prediction mode #31.

As illustrated in FIG. 18b, the position of the reference pixel used for filtering is determined according to the position of each pixel of a pixel 1801b of the left block boundary.

That is, the value of the filtered pixel (x, y) on the left block boundary is calculated as {(12×the value of the prediction pixel (x, y)+2×the value of the first reference pixel (x−1, y+1)+2×the value of the second reference pixel (x−1, y+2)+8)>>4}.

FIG. 18c illustrates filtering for the boundary pixel of the prediction block in the case of intra prediction mode #32.

As illustrated in FIG. 18c, the position of the reference pixel used for filtering is determined according to the position of each pixel of a pixel 1801c of the left block boundary.

That is, the value of the filtered pixel (x, y) on the left block boundary is calculated as {(12×the value of the prediction pixel (x, y)+1×the value of the first reference pixel (x−1, y+1)+3×the value of the second reference pixel (x−1, y+2)+8)>>4}.

FIG. 18d illustrates filtering for the boundary pixel of the prediction block in the case of intra prediction mode #33.

As illustrated in FIG. 18d, the position of the reference pixel used for filtering is determined according to the position of each pixel of a pixel 1801d of the left block boundary.

That is, the value of the filtered pixel (x, y) on the left block boundary is calculated as {(12×the value of the prediction pixel (x, y)+3×the value of the first reference pixel (x−1, y+2)+1×the value of the second reference pixel (x−1, y+3)+8)>>4}.

Next, when the intra prediction mode is mode #3, #4, #5, #6, #7, #8, #9, or #10 (for example, among 67 intra prediction modes as illustrated in FIGS. 5a and 5b above), the filtering method of the boundary pixel of the prediction block will be described.

FIGS. 19a-19d and 20a-20d are diagrams for describing the filtering of the boundary pixel of the prediction block when the intra prediction mode is 3rd, 4th, 5th, 6th, 7th, 8th, 9th, or 10th mode among 67 intra prediction modes according to an embodiment of the present invention.

Since intra prediction 3rd, 4th, 5th, 6th, 7th, 8th, 9th, or 10th mode is a mode to perform the prediction from the left reference sample, the filtering is performed on the top boundary pixel of the prediction block and there is a difference between the position of the reference pixel used for filtering and the weight of the reference pixel and the prediction pixel according to an angle (i.e., an angle of a prediction direction of each mode.

FIG. 19a illustrates filtering for the boundary pixel of the prediction block in the case of intra prediction mode #3.

As illustrated in FIG. 19a, the position of the reference pixel used for filtering is determined according to the position of each pixel of a pixel 1901a of a top block boundary.

That is, the value of the filtered pixel (x, y) on the top block boundary is calculated as {(8×the value of the prediction pixel (x, y)+7×the value of the first reference pixel (x+1, y−1)+1×the value of the second reference pixel (x+2, y−1)+8)>>4}.

FIG. 19b illustrates filtering for the boundary pixel of the prediction block in the case of intra prediction mode #4.

As illustrated in FIG. 19b, the position of the reference pixel used for filtering is determined according to the position of each pixel of a pixel 1901b of the top block boundary.

That is, the value of the filtered pixel (x, y) on the top block boundary is calculated as {(8×the value of the prediction pixel (x, y)+6×the value of the first reference pixel (x+1, y−1)+2×the value of the second reference pixel (x+2, y−1)+8)>>4}.

FIG. 19c illustrates filtering for the boundary pixel of the prediction block in the case of intra prediction mode #5.

As illustrated in FIG. 19c, the position of the reference pixel used for filtering is determined according to the position of each pixel of a pixel 1901c of the top block boundary.

That is, the value of the filtered pixel (x, y) on the top block boundary is calculated as {(12×the value of the prediction pixel (x, y)+3×the value of the first reference pixel (x+1, y−1)+1×the value of the second reference pixel (x+2, y−1)+8)>>4}.

FIG. 19d illustrates filtering for the boundary pixel of the prediction block in the case of intra prediction mode #6.

As illustrated in FIG. 19d, the position of the reference pixel used for filtering is determined according to the position of each pixel of a pixel 1901d of the top block boundary.

That is, the value of the filtered pixel (x, y) on the top block boundary is calculated as {(12×the value of the prediction pixel (x, y)+2×the value of the first reference pixel (x+1, y−1)+2×the value of the second reference pixel (x+2, y−1)+8)>>4}.

FIG. 20a illustrates filtering for the boundary pixel of the prediction block in the case of intra prediction mode #7.

As illustrated in FIG. 20a, the position of the reference pixel used for filtering is determined according to the position of each pixel of a pixel 2001a of the top block boundary.

That is, the value of the filtered pixel (x, y) on the top block boundary is calculated as {(12×the value of the prediction pixel (x, y)+3×the value of the first reference pixel (x+1, y−1)+2×the value of the second reference pixel (x+2, y−1)+8)>>4}.

FIG. 20b illustrates filtering for the boundary pixel of the prediction block in the case of intra prediction mode #8.

As illustrated in FIG. 20b, the position of the reference pixel used for filtering is determined according to the position of each pixel of a pixel 2001b of the top block boundary.

That is, the value of the filtered pixel (x, y) on the top block boundary is calculated as {(12×the value of the prediction pixel (x, y)+1×the value of the first reference pixel (x+1, y−1)+3×the value of the second reference pixel (x+2, y−1)+8)>>4}.

FIG. 20c illustrates filtering for the boundary pixel of the prediction block in the case of intra prediction mode #9.

As illustrated in FIG. 20c, the position of the reference pixel used for filtering is determined according to the position of each pixel of a pixel 2001c of the top block boundary.

That is, the value of the filtered pixel (x, y) on the top block boundary is calculated as {(12×the value of the prediction pixel (x, y)+3×the value of the first reference pixel (x+2, y−1)+1×the value of the second reference pixel (x+3, y−1)+8)>>4}.

FIG. 20d illustrates filtering for the boundary pixel of the prediction block in the case of intra prediction mode #10.

As illustrated in FIG. 20d, the position of the reference pixel used for filtering is determined according to the position of each pixel of a pixel 2001d of the top block boundary.

That is, the value of the filtered pixel (x, y) on the top block boundary is calculated as {(12×the value of the prediction pixel (x, y)+3×the value of the first reference pixel (x+2, y−1)+1×the value of the second reference pixel (x+3, y−1)+8)>>4}.

Next, when the intra prediction mode is 59th, 60th, 61th, 62th, 63th, 64th, 65th, or 66th mode (for example, among 67 intra prediction modes as illustrated in FIGS. 5A and 5B above), the filtering method of the boundary pixel of the prediction block will be described.

FIGS. 21a-21d and 22a-22d are diagrams for describing the filtering of the boundary pixel of the prediction block when the intra prediction mode is 59th, 60th, 61th, 62th, 63th, 64th, 65th, or 66th mode among 67 intra prediction modes according to an embodiment of the present invention.

Since intra prediction 59th, 60th, 61th, 62th, 63th, 64th, 65th, or 66th mode is a mode to perform the prediction from the top reference sample, the filtering is performed on the left boundary pixel of the prediction block and there is a difference between the position of the reference pixel used for filtering and the weight of the reference pixel and the prediction pixel according to an angle (i.e., an angle of a prediction direction of each mode).

FIG. 21a illustrates filtering for the boundary pixel of the prediction block in the case of intra prediction mode #59.

As illustrated in FIG. 21a, the position of the reference pixel used for filtering is determined according to the position of each pixel of a pixel 2101a of the left block boundary.

That is, the value of the filtered pixel (x, y) on the left block boundary is calculated as {(12×the value of the prediction pixel (x, y)+3×the value of the first reference pixel (x−1, y+2)+1×the value of the second reference pixel (x−1, y+3)+8)>>4}.

FIG. 21b illustrates filtering for the boundary pixel of the prediction block in the case of intra prediction mode #60.

As illustrated in FIG. 21b, the position of the reference pixel used for filtering is determined according to the position of each pixel of a pixel 2101b of the left block boundary.

That is, the value of the filtered pixel (x, y) on the left block boundary is calculated as {(12×the value of the prediction pixel (x, y)+3×the value of the first reference pixel (x−1, y+2)+1×the value of the second reference pixel (x−1, y+3)+8)>>4}.

FIG. 21c illustrates filtering for the boundary pixel of the prediction block in the case of intra prediction mode #61.

As illustrated in FIG. 21c, the position of the reference pixel used for filtering is determined according to the position of each pixel of a pixel 2101c of the left block boundary.

That is, the value of the filtered pixel (x, y) on the left block boundary is calculated as {(12×the value of the prediction pixel (x, y)+1×the value of the first reference pixel (x−1, y+1)+3×the value of the second reference pixel (x−1, y+2)+8)>>4}.

FIG. 21d illustrates filtering for the boundary pixel of the prediction block in the case of intra prediction mode #62.

As illustrated in FIG. 21d, the position of the reference pixel used for filtering is determined according to the position of each pixel of a pixel 2101d of the left block boundary.

That is, the value of the filtered pixel (x, y) on the left block boundary is calculated as {(12×the value of the prediction pixel (x, y)+3×the value of the first reference pixel (x−1, y+1)+2×the value of the second reference pixel (x−1, y+2)+8)>>4}.

FIG. 22a illustrates filtering for the boundary pixel of the prediction block in the case of intra prediction mode #63.

As illustrated in FIG. 22a, the position of the reference pixel used for filtering is determined according to the position of each pixel of a pixel 2201a of the left block boundary.

That is, the value of the filtered pixel (x, y) on the left block boundary is calculated as {(12×the value of the prediction pixel (x, y)+2×the value of the first reference pixel (x−1, y+1)+2×the value of the second reference pixel (x−1, y+2)+8)>>4}.

FIG. 22b illustrates filtering for the boundary pixel of the prediction block in the case of intra prediction mode #64.

As illustrated in FIG. 22b, the position of the reference pixel used for filtering is determined according to the position of each pixel of a pixel 2201b of the left block boundary.

That is, the value of the filtered pixel (x, y) on the left block boundary is calculated as {(12×the value of the prediction pixel (x, y)+3×the value of the first reference pixel (x−1, y+1)+1×the value of the second reference pixel (x−1, y+2)+8)>>4}.

FIG. 22c illustrates filtering for the boundary pixel of the prediction block in the case of intra prediction mode #65.

As illustrated in FIG. 22c, the position of the reference pixel used for filtering is determined according to the position of each pixel of a pixel 2201c of the left block boundary.

That is, the value of the filtered pixel (x, y) on the left block boundary is calculated as {(8×the value of the prediction pixel (x, y)+6×the value of the first reference pixel (x−1, y+1)+2×the value of the second reference pixel (x−1, y+2)+8)>>4}.

FIG. 22d illustrates filtering for the boundary pixel of the prediction block in the case of intra prediction mode #66.

As illustrated in FIG. 22d, the position of the reference pixel used for filtering is determined according to the position of each pixel of a pixel 2201d of the left block boundary.

That is, the value of the filtered pixel (x, y) on the left block boundary is calculated as {(8×the value of the prediction pixel (x, y)+7×the value of the first reference pixel (x−1, y+1)+1×the value of the second reference pixel (x−1, y+2)+8)>>4}.

As described in FIGS. 6 to 22 above, the filtering of the block boundary pixel in the prediction block generated through the intra prediction is performed according to each intra prediction mode. However, up to now, in a filtering process, whether the filtering is applied is determined according to the size of the prediction block. Such a process is similar even in a QTBT block partitioning structure.

FIG. 23 illustrates a process of filtering a boundary pixel of a prediction block in a QTBT structure according to an embodiment of the present invention.

Referring to FIG. 23, when the decoder starts predictor (i.e., prediction sample/pixel) filtering, the decoder receives the predictor as an input value (i.e., prediction block generation) and the decoder checks whether the intra prediction mode (intraPredMode) is mode #18, #19, or #17 (i.e., horizontal mode) to generate the prediction block from the left block or mode #49, #50, or #51 (i.e., vertical mode) to generate the prediction block from the top block (S2301) (i.e., intraPredMode(18, 19, 20)|| intraPredMode(50, 51, 49)).

In step S2301, when the intra prediction mode (intraPredMode) is mode #18, #19, or #17 (i.e., horizontal mode) or mode #49, #50, or #51 (i.e., vertical mode), the decoder checks whether residual differential pulse code modulation (RDPCM) and TQ Bypass is applied (S2302) (i.e., !(RDPCMenabled && TQ Bypass)).

Here, the RDPCM as an HEVC range extension (Range-Extension) technique is a technique that performs a differential pulse code modulation (DPCM) for a residual signal and transmits the residual signal and the TQ Bypass is a method that transmits the residual signal without transformation/quantization.

When the RDPCM and the TQ Bypass are not applied in step S2302, the decoder checks whether the prediction block is a luminance (Luma) block and the size of prediction block size is smaller than 16×16 (S2303) (i.e., Luma && block<16×16). Otherwise, the decoder terminates the predictor filtering.

In step S2303, when the prediction block is the luminance (Luma) block and the size of the prediction block is smaller than 16×16, the decoder performs predictor filtering process 1 (S2304). Otherwise, the decoder terminates the predictor filtering.

Here, in the case of modes #18, #19, and #17 (i.e., the horizontal mode), the process of the predictor filtering process 1 is performed according to the method illustrated in FIGS. 9a to 9c above and in the case of modes #49, #50, and #51 (i.e., the vertical mode), the process of the predictor filtering process 1 is performed according to the method illustrated in FIGS. 10a to 10c above.

Meanwhile, in step S2301, when the intra prediction mode (intraPredMode) is not modes #18, #19, and #17 (i.e., the horizontal mode) and #49, #50, and #51 (i.e., the vertical mode), the decoder checks whether PDPC is not applied, a width is 16 or more, or RSAF is not applied (S2305) (i.e., (!PDPC||width>=16||!SPS.useRSAF).

Here, since the Position Dependent Intra Prediction Combination (PDPC) generates a self-prediction block, the PDPC does not require and the Adaptive reference sample smoothing (ARSS) generates the prediction block by filtering the reference sample, the ARSS is a technique that prevents excessive filtering.

In step S2305, when the PDPC is not applied, the width is 16 or more, or the RSAF is not applied, the decoder determines that the prediction block is the luminance (Luma) block, the width of the prediction block is greater than 2, and a height of the prediction block is greater than 2 (S2306). Otherwise, the decoder terminates the predictor filtering.

In step S2306, when the prediction block is the luminance (Luma) block, the width of the prediction block is greater than 2, and the height of the prediction block is larger than 2, the decoder performs predictor filtering process 2 (S2307). Otherwise, the decoder terminates the predictor filtering.

Here, the predictor filtering process 2 will be described with reference to FIG. 24.

Meanwhile, steps S2302 and S2305 may be selectively implemented and omitted.

FIG. 24 illustrates a predictor filtering process in the QTBT structure according to an embodiment of the present invention.

Referring to FIG. 24, when the predictor filtering process 2 starts, the decoder checks whether the intra prediction mode (intraPredMode) is the DC mode or more than mode #1 and less than mode #11 or more than mode #58 and #66 or less (S2401) (i.e., intraPredMode (DC)||1<intraPredMode<11 || 58<intraPredMode<=66).

In step S2401, when the intra prediction mode (intraPredMode) is the DC mode or more than mode #1 and less than mode #11 or more than mode #58 and #66 or less, the decoder checks whether the intra prediction mode (intraPredMode) is the DC mode (S2402). Otherwise, the decoder terminates the predictor filtering process 2.

In step S2402, when the intra prediction mode (intraPredMode) is the DC mode, the decoder performs the boundary pixel filtering (S2403). The boundary pixel filtering is performed as in the methods illustrated in FIGS. 7 and 8 above.

On the contrary, when the intra prediction mode (intraPredMode) is not the DC mode in step S2402, the decoder checks whether the intra prediction mode (intraPredMode) is #2 or #66 (S2404).

In step S2404, when the intra prediction mode (intraPredMode) is mode #66, the decoder filters a boundary pixel corresponding to a boundary periphery 2 lines (S2405).

The boundary pixel filtering for mode #66 follows the methods illustrated in FIGS. 14 to 16 above and the boundary pixel corresponding to the boundary periphery 2 lines is filtered.

The decoder checks whether the width (BlockWidth) of the prediction block is larger than 2 (S2406).

When the width (BlockWidth) of the prediction block is larger than 2, the decoder filters a boundary pixel corresponding to a boundary periphery 2 excess line (S2407). Otherwise, the decoder terminates the predictor filtering process 2.

When the intra prediction mode (intraPredMode) is mode #2 in step S2404, the decoder filters the boundary pixel corresponding to the boundary periphery 2 lines (S2408).

The boundary pixel filtering for mode #2 follows the methods illustrated in FIGS. 11 to 13 above and the boundary pixel corresponding to the boundary periphery 2 lines is filtered.

The decoder checks whether the height (BlockHeight) of the prediction block is larger than 2 (S2409).

When the height (BlockHeight) of the prediction block is larger than 2, the decoder filters a boundary pixel corresponding to the boundary periphery 2 excess line (S2410). Otherwise, the decoder terminates the predictor filtering process 2.

When the intra prediction mode (intraPredMode) is not mode #66 or #2, the decoder filters a boundary pixel corresponding to a boundary periphery 1 line (S2411).

Filtering Method of Boundary Pixel of Prediction Block

1) Embodiment 1

An embodiment of the present invention proposes the filtering method of the boundary pixel when the intra prediction (intra picture prediction) of the non-square block is the DC mode.

As described in FIGS. 7 and 8 above, in the case of the DC mode, the filtering is performed with respect to the left and top block boundaries. However, in the HEVC, the filtering is performed only with respect to the luminance (luma) block of 16×16 block size or less.

The constraint needs to be adaptively applied to the non-square block. However, according to the method currently defined above, the constraint may not be adaptively applied to a width or the height length of 32×4, 4×32, 4×32, etc., because the filtering of the boundary pixel is applied only to the blocks of 16×16 block size or less. In order to solve such a problem, proposed is a method for determining whether to perform the filtering according to an adaptive condition when the prediction mode is the DC mode.

FIG. 25 is a diagram illustrating a method for filtering a boundary pixel when an intra prediction mode is a DC mode according to an embodiment of the present invention.

Referring to FIG. 25, when the DC mode boundary pixel filtering starts, the decoder checks whether the current prediction block is the non-square block (S2501).

When the current prediction block is the non-square block in step S2501, the decoder checks whether the width of the prediction block is a maximum filtering size (MAXIMUM_FILTERING_SIZE) or less (S2502) (i.e., Width<=MAXIMUM_FILTERING_SIZE).

When the width of the prediction block is the maximum filtering size (MAXIMUM_FILTERING_SIZE) or less in step S2502, the decoder performs filtering of the top boundary pixel of the prediction block (S2503).

Here, the top boundary pixel filtering follows the methods illustrated in FIGS. 7 and 8 above and only the top boundary pixel is filtered.

When the top boundary pixel filtering is performed step S2503 and then, the width of the prediction block exceeds the maximum filtering size (MAXIMUM_FILTERING_SIZE) in step S2502, the decoder checks whether the height of the prediction block is the maximum filtering size (MAXIMUM_FILTERING_SIZE) or less (S2504) (i.e., Height<=MAXIMUM_FILTERING_SIZE).

When the width of the prediction block is the maximum filtering size (MAXIMUM_FILTERING_SIZE) or less in step S2504, the decoder performs filtering of the left boundary pixel of the prediction block (S2505). Otherwise, the decoder terminates DC mode boundary pixel filtering.

Here, the left boundary pixel filtering follows the methods illustrated in FIGS. 7 and 8 above and only the left boundary pixel is filtered.

Meanwhile, in step S2501, when the current prediction block is not the non-square block (i.e., a square block), the decoder performs the existing boundary pixel filtering for the DC mode (S2506).

Here, the existing boundary pixel filtering for the DC mode follows the methods illustrated in FIGS. 7 and 8 above.

2) Embodiment 2

An embodiment of the present invention proposes the filtering method of the boundary pixel when the intra prediction mode of the non-square block is the horizontal or vertical mode.

The horizontal mode (or mode #17, #18, or #19 in a prediction method using 67 intra prediction modes) of the HEVC as described in FIGS. 9a to 9c above and the vertical mode (or mode #49, #50, or #51 in the prediction method using 67 intra prediction modes) of the HEVC as described in FIGS. 10a to 10c above is subjected to the block boundary pixel filtering.

However, the filtering is not be performed under all conditions and the filtering is performed only with respect to blocks having the size of the prediction block of 16×16 or less under a condition illustrated in FIG. 26 below.

FIG. 26 is a diagram illustrating a boundary pixel filtering process when the intra prediction mode is a horizontal/vertical mode according to an embodiment of the present invention.

Referring to FIG. 26, when the boundary pixel filtering of the horizontal/vertical mode (or mode #17, #18, or #19 or #49, #50, or #51 in the prediction method using 67 intra prediction modes) starts, the decoder checks whether the RDPCM and the TQ Bypass are not applied to the current prediction block (S2601) (i.e., !(RDPCMenabled && TQ Bypass)).

When the RDPCM and the TQ Bypass are not applied to the current prediction block in step S2601, the decoder checks whether the prediction block is the luminance (Luma) block and the size of prediction block size is 16×16 or less (S2602) (i.e., Luma && block<=16×16).

When the prediction block is the luminance (Luma) block and the size of the prediction block is 16×16 or less in step S2602, the decoder performs THE predictor filtering process 1 (S2603). Otherwise, the boundary pixel filtering of the horizontal/vertical mode (or mode #17, #18, or #19 or #49, #50, or #51 in the prediction method using 67 intra prediction modes) is terminated.

Here, the predictor filtering process 1 follows the method illustrated in FIG. 9a to 9c or 10 above.

Meanwhile, step S2601 may be selectively implemented and omitted.

The condition of FIG. 26 is required to be adaptively applied to a block which may have various sizes due to the partitioning of the QTBT structure. For example, according to the condition of FIG. 26, the boundary pixel filtering is not performed in blocks of 4×32, 32×4, and the like.

In order to solve such a problem, in the embodiment, the filtering of the top block boundary pixel may be performed with respect to 16×N, 8×N, and 4×N blocks predicted in modes #17, #18, or #19 (in the case of the prediction method in which 67 prediction modes are defined) to perform the prediction from the left block or in the horizontal mode of the HEVC as illustrated in FIG. 27 below. Similarly, the filtering of the left block boundary pixel may be performed with respect to N×4, N×8, and N×16 blocks predicted in modes #49, #50, or #51 (in the case of the prediction method in which 67 prediction modes are defined) to perform the prediction from the top block or in the vertical mode of the HEVC.

FIG. 27 is a diagram illustrating a method for filtering a boundary pixel of a prediction block according to an embodiment of the present invention.

Referring to FIG. 27, when the boundary pixel filtering of the horizontal/vertical mode (or mode #17, #18, or #19 or #49, #50, or #51 in the prediction method using 67 intra prediction modes) starts, the decoder checks whether the RDPCM and the TQ Bypass are not applied to the current prediction block and the current prediction block is the luminance (luma) block (S2701) (i.e., !(RDPCMenabled && TQ Bypass) && Luma).

When the RDPCM and the TQ Bypass are not applied to the current prediction block and the current prediction block is the luminance (luma) block in step S2701, the decoder checks whether the directionality of the intra prediction mode (predIntraMode) of the current prediction block belongs to a predefined range ($-\alpha$ to $+\alpha$) based on the directionality (IntraDir(Hor)) of the horizontal intra prediction mode and the width (BlockWidth) of the block is equal to or less than a maximum block size $\beta$ of a predefined boundary pixel filtering (S2702) (i.e., (IntraDir(Hor)$-\alpha$<=predIntraMode<=IntraDir(Hor)+$\alpha$) && (BlockWidth<=$\beta$)). Otherwise, the boundary pixel filtering is terminated.

Here, $\alpha$ represents a difference of an intra direction mode and $\beta$ represents the maximum block size of the boundary filtering.

When the directionality of the intra prediction mode (predIntraMode) of the current prediction block belongs to the predefined range ($-\alpha$ to $+\alpha$) based on the directionality (IntraDir(Hor)) of the horizontal intra prediction mode and the width (BlockWidth) of the block is equal to or less than the maximum block size $\beta$ of the predefined boundary pixel filtering in step S2702, the decoder performs the top boundary pixel filtering of the prediction block (S2703).

Here, the top boundary pixel filtering of the prediction block may adopt the method described in FIGS. 9a to 9c above.

After the top boundary pixel filtering of the prediction block is performed or when the directionality of the intra prediction mode (predIntraMode) of the current prediction block belongs to the predefined range ($-\alpha$ to $+\alpha$) based on the directionality (IntraDir(Hor)) of the horizontal intra prediction mode and the width BlockWidth of the block is equal to or less than the maximum block size $\beta$ of the predefined boundary pixel filtering in step S2702, the decoder checks whether the directionality of the intra prediction mode (predIntraMode) of the current prediction block belongs to a predefined range ($-\alpha$ to $+\alpha$) based on the directionality (IntraDir(Ver)) of the vertical intra prediction mode and the height (BlockHeight) of the block is equal to or less than a maximum block size $\beta$ of a predefined boundary pixel filtering (S2704) (i.e., (IntraDir(Ver)$-\alpha$<=predIntraMode<=IntraDir(Ver)+$\alpha$) && (BlockHeight<=$\beta$)).

When the directionality of the intra prediction mode (predIntraMode) of the current prediction block belongs to the predefined range ($-\alpha$ to $+\alpha$) based on the directionality (IntraDir(Ver)) of the vertical intra prediction mode and the height (BlockHeight) of the block is equal to or less than the maximum block size $\beta$ of the predefined boundary pixel filtering in step S2704, the decoder performs the left boundary pixel filtering of the prediction block (S2705).

Here, the left boundary pixel filtering of the prediction block may adopt the method described in FIGS. 10a to 10c above.

Meanwhile, step S2701 may be selectively implemented and omitted.

3) Embodiment 3

An embodiment of the present invention proposes the filtering method of the boundary pixel of the prediction block when the intra prediction mode is 2 or 34 in a case where a total number of intra prediction modes is 35 and when the intra prediction mode of the non-square block is 2 or 66 in a case where a total number of intra prediction modes is 67.

As described in FIGS. 11 to 16 above, a filtering determining structure of modes of to filter the boundary pixel which belongs to four lines around the block boundary is partially modified and applied in the current QTBT structure. However, since such a determining structure is not optimized in the current QTBT structure, the embodiment proposes a method that may efficiently apply the filtering of the boundary pixel.

In the QTBT structure, due to a binary tree, a minimum block size may correspond to 4×N or N×4 in the case of luma and 2×N or N×2 in the case of chroma. For this reason, as illustrated in FIG. 25 described above, in the filtering structure applied in the QTBT, there is a problem that the entire prediction block is filtered in a luminance (Luma) block having a size of 4×N or N×4 and all prediction pixels of a 2×N or N×2 block are also filtered in the case of the chroma.

In order to solve such a problem, an embodiment of the present invention proposes a method for limiting a filtering range of the boundary pixel according to the prediction direction and the block size. This will be described with reference to the following drawing.

FIGS. 28 and 29 are diagrams illustrating a method for filtering a boundary pixel of a prediction block according to an embodiment of the present invention.

FIGS. 28a and 28b illustrate cases where mode #2 is applied when the total number of intra prediction modes is 35/67 and FIGS. 29a and 29b illustrate cases where mode #34 is applied when the total number of intra prediction modes is 35 and mode #66 is applied when the total number of intra prediction modes is 67.

As illustrated in FIGS. 28a and 28b, when the intra prediction mode is mode #2, if the size of the block is 8×N, all pixels of the block is filtered in the related art, but in the method proposed by the embodiment, only two pixel lines 2801b of the prediction block boundary may be filtered for the N×4 block.

Further, as illustrated in FIGS. 29a and 29b, when the intra prediction mode is mode #34/66, if the size of the block is N×8, all pixels of the block is filtered in the related art, but in the method proposed by the embodiment, only pixels 2091b which belong to two pixel lines of the prediction block boundary may be filtered for the N×4 block.

Here, a method for filtering the pixels which belong to two pixel lines around the block boundary may be divided into two methods.

The existing filtering method is used as illustrated in FIG. 30 and only two pixel lines around the boundary may be filtered or a new weak filter may be applied for the corresponding prediction block as illustrated in FIG. 31.

FIG. 30 is a diagram illustrating a method for filtering a boundary pixel of a prediction block according to an embodiment of the present invention.

Referring to FIG. 30, when the predictor filtering process 2 starts, the decoder checks whether the intra prediction mode (intraPredMode) is the DC mode or more than mode #1 and less than mode #11 or more than mode #58 and #66 or less (S3001) (i.e., intraPredMode(DC)||1<intraPredMode<11|| 58<intraPredMode<=66).

When the intra prediction mode (intraPredMode) is the DC mode or more mode #1 and less than mode #11 or more than mode #58 and #66 or less, the decoder checks whether the intra prediction mode (intraPredMode) is the DC mode (S3002). Otherwise, the decoder terminates the predictor filtering process 2.

When the intra prediction mode (intraPredMode) is the DC mode in step S3002, the decoder performs the boundary pixel filtering (S3003). The prediction block boundary pixel filtering is performed as in the methods illustrated in FIGS. 7 and 8.

On the contrary, when the intra prediction mode (intraPredMode) is not the DC mode in step S3002, the decoder checks whether the intra prediction mode (intraPredMode) is #2 or #66 (S3004).

When the intra prediction mode (intraPredMode) is #2 or #66 in step S3004, the decoder checks whether the intra prediction mode (intraPredMode) is mode #2 and the block height is more than 4 or the intra prediction mode (intraPredMode) is mode #66 and the block width is more than 4 (S3005) (i.e., (intraPredMode(2) && blockHeight>4)|| (intraPredMode(66) && blockWidth>4)).

When the intra prediction mode (intraPredMode) is mode #2 and the block height is more than 4 or the intra prediction mode (intraPredMode) is mode #66 and the block width is more than 4 in step S3005, the decoder filters the boundary pixels which belong to the prediction block boundary periphery 4 lines (S3006). Otherwise, the decoder filters the boundary pixels which belong to the prediction block boundary periphery 2 lines.

Here, filtering the boundary pixel of the prediction block may adopt the methods described in FIGS. 11 to 16 above. However, in step S3007, only the pixels which belong to the prediction block boundary periphery 2 lines may be filtered.

When the intra prediction mode (intraPredMode) is neither mode #2 nor mode #66, the decoder filters a boundary pixel corresponding to a boundary periphery 1 line (S3008).

Here, filtering the boundary pixel of the prediction block may adopt the methods described in FIGS. 17 to 22 above.

Meanwhile, after step S3004, when the intra prediction mode (intraPredMode) of the current block is mode #2 or modes #3 to #10, the filtering of the boundary pixel may be applied only in the case where the width of the current block is equal to or less than the maximum block size of the boundary filtering. That is, when the width of the current block is equal to or less than the maximum block size of the boundary filtering, step S3005 or S3008 may be subsequently performed.

Further, after step S3004, when the intra prediction mode (intraPredMode) of the current block is mode #66 or modes #59 to #65, the filtering of the boundary pixel may be applied only in the case where the height of the current block is equal to or less than the maximum block size of the boundary filtering. That is, in the case where the height of the current block is equal to or less than the maximum block size of the boundary filtering, step S3005 or S3008 may be subsequently performed.

FIG. 31 is a diagram illustrating a method for filtering a boundary pixel of a prediction block according to an embodiment of the present invention.

Referring to FIG. 31, when the predictor filtering process 2 starts, the decoder checks whether the intra prediction mode (intraPredMode) is the DC mode or more than mode #1 and less than mode #11 or more than mode #58 and #66 or less (S3101) (i.e., intraPredMode(DC) ||1<intraPredMode<11||58<intraPredMode<=66).

When the intra prediction mode (intraPredMode) is the DC mode or more mode #1 and less than mode #11 or more than mode #58 and #66 or less, the decoder checks whether the intra prediction mode (intraPredMode) is the DC mode (S3102). Otherwise, the decoder terminates the predictor filtering process 2.

When the intra prediction mode (intraPredMode) is the DC mode in step S3102, the decoder performs the boundary pixel filtering (S3103). The prediction block boundary pixel filtering is performed as in the methods illustrated in FIGS. 7 and 8.

On the contrary, when the intra prediction mode (intraPredMode) is not the DC mode in step S3102, the decoder checks whether the intra prediction mode (intraPredMode) is #2 or #66 (S3104).

When the intra prediction mode (intraPredMode) is #2 or #66 in step S3104, the decoder checks whether the intra prediction mode (intraPredMode) is mode #2 and the block height is more than 4 or the intra prediction mode(intraPredMode) is mode #66 and the block width is more than 4 (S3105) (i.e., (intraPredMode(2) && blockHeight>4)|| (intraPredMode(66) && blockWidth>4)).

When the intra prediction mode (intraPredMode) is mode #2 and the block height is more than 4 or the intra prediction mode (intraPredMode) is mode #66 and the block width is more than 4 in step S3105, the decoder filters the boundary pixels which belong to a prediction block boundary periphery 4 lines (S3106). Otherwise, the decoder filters the boundary pixels which belong to the prediction block boundary periphery 2 lines by the weak filter (S3107).

Here, filtering the boundary pixel of the prediction block may adopt the methods described in FIGS. 11 to 16 above in step S3106. However, in step S3107, only the pixels which belong to the prediction block boundary periphery 2 lines may be filtered.

When the intra prediction mode (intraPredMode) is neither mode #2 nor mode #66, the decoder filters the boundary pixel corresponding to the boundary periphery 1 line (S3108).

Here, filtering the boundary pixel of the prediction block may adopt the methods described in FIGS. 17 to 22 above.

Meanwhile, after step S3104, when the intra prediction mode (intraPredMode) of the current block is mode #2 or modes #3 to #10, the filtering of the boundary pixel may be applied only in the case where the width of the current block is equal to or less than the maximum block size of the boundary filtering. That is, when the width of the current block is equal to or less than the maximum block size of the boundary filtering, step S3105 or S3108 may be subsequently performed.

Further, after step S3104, when the intra prediction mode (intraPredMode) of the current block is mode #66 or modes #59 to #65, the filtering of the boundary pixel may be applied only in the case where the height of the current block is equal to or less than the maximum block size of the boundary filtering. That is, in the case where the height of the current block is equal to or less than the maximum block size of the boundary filtering, step S3105 or S3108 may be subsequently performed.

FIG. 32 is a diagram illustrating an inter prediction method according to an embodiment of the present invention.

Referring to FIG. 32, the decoder derives the intra prediction mode of the current block (S3201).

As described in FIGS. 5a and 5b above, the intra prediction mode may have a prediction directionality for the position of the reference sample used for prediction according to the prediction mode and may not have the directionality. Further, the intra prediction mode may be defined as a total of 35 modes or defined as a total of 67 modes.

The decoder may check whether neighboring samples of the current block may be used for the prediction and configure reference samples to be used for the prediction (S3202).

For example, the neighboring samples of the current block in the intra prediction mean samples neighboring to the left boundary of a current processing block having a size of nS×nS' and a total of 2×nS' samples neighboring to the bottom-left side, a sample neighboring to a top boundary of the current block and a total of 2×nS samples neighboring to the top-right side, and one sample neighboring to the top-left side of the current block.

In this case, some of the neighboring samples of the current processing block may not yet be decoded or may not be available. In this case, the decoder may configure the reference samples to be used for the prediction by substituting samples which are not available as the available samples.

Further, the decoder may filter the reference sample based on the intra prediction mode. Whether to filter the reference sample may be determined based on the size of the current block. Further, the filtering method of the reference sample may be determined by a filtering flag delivered from the encoder.

The decoder generates the prediction sample of the current block by using the reference sample (S3203).

The decoder generates the prediction sample of the current block by using the reference sample neighboring to the current block according to the intra prediction mode of the current block.

The decoder filters the sample adjacent to the top boundary and/or the left boundary of the current block among the prediction samples (S3204).

The decoder may filter a prediction sample (i.e., prediction block boundary pixel) adjacent to the boundary of the current block using the methods described in FIGS. 5 to 31 above.

As described above, when the current block is the non-square block, whether to filter the sample adjacent to the top boundary of the current block may be determined by considering only the width of the current block and whether to filter the sample adjacent to the left boundary of the current block may be determined by considering only the height of the current block.

For example, when the intra prediction mode of the current block is the DC mode, filtering the sample adjacent to the top boundary of the current block may be performed when the width of the current block is equal to or less tan a predefined size and filtering the sample adjacent to the left boundary of the current block may be performed when the height of the current block is equal to or less than a predefined size.

Further, when the directionality of the intra prediction mode of the current block belongs to a predefined range based on the horizontal intra prediction mode, filtering the sample adjacent to the top boundary of the current block may be performed when the height of the current block is equal to or less than the predefined size.

Further, when the directionality of the intra prediction mode of the current block belongs to a predefined range based on the vertical intra prediction mode, filtering the sample adjacent to the left boundary of the current block may be performed when the width of the current block is equal to or less than the predefined size.

Further, in the intra prediction mode method in which a total of 67 intra prediction modes are defined, when the intra prediction mode of the current block is mode #2, filtering the sample adjacent to the top boundary of the current block may be performed when the width of the current block is equal to or less than the predefined size. In this case, when the height of the current block is more than 4, samples which belong to four lines adjacent to the top boundary of the current block may be filtered. On the contrary, when the height of the current block is not more than 4, only samples which belong to two lines adjacent to the top boundary of the current block may be filtered.

Further, in the intra prediction mode method in which a total of 67 intra prediction modes are defined, when the intra prediction mode of the current block is mode #66, filtering the sample adjacent to the left boundary of the current block may be performed when the height of the current block is equal to or less than the predefined size. In this case, when the width of the current block is more than 4, samples which belong to four lines adjacent to the left boundary of the current block may be filtered. On the contrary, when the width of the current block is not more than 4, only samples which belong to two lines adjacent to the left boundary of the current block may be filtered.

FIG. 33 is a diagram more specifically illustrating an inter prediction unit according to an embodiment of the present invention.

Referring to FIG. 33, an intra prediction unit implements the functions, procedures, and/or methods proposed in FIGS. 5 to 31 above. Further, the intra prediction unit is combined with all or some of the components of the encoder illustrated in FIG. 1 above to be implemented as an encoding apparatus or combined with all or some of the components of the decoder illustrated in FIG. 2 above to be implemented as a decoding apparatus.

Specifically, the intra prediction unit may be configured to include a prediction mode deriving unit 3301, a reference sample configuring unit 3302, a prediction sample generating unit 3303, and a prediction sample filtering unit 3304.

The intra prediction mode deriving unit 3301 derives the intra prediction mode of the current block.

As described in FIGS. 5a and 5b above, the intra prediction mode may have a prediction directionality for the position of the reference sample used for prediction according to the prediction mode and may not have the directionality. Further, the intra prediction mode may be defined as a total of 35 modes or defined as a total of 67 modes.

The reference sample configuring unit 3302 checks whether neighboring samples of the current block may be used for the prediction and configure reference samples to be used for the prediction.

For example, the neighboring samples of the current block in the intra prediction mean samples neighboring to the left boundary of a current processing block having a size of nS×nS' and a total of 2×nS' samples neighboring to the bottom-left side, a sample neighboring to a top boundary of the current block and a total of 2×nS samples neighboring to the top-right side, and one sample neighboring to the top-left side of the current block.

In this case, some of the neighboring samples of the current processing block may not yet be decoded or may not be available. In this case, the reference sample configuring unit 3302 may configure the reference samples to be used for the prediction by substituting samples which are not available as the available samples.

Further, the reference sample configuring unit 3302 may filter the reference sample based on the intra prediction mode. Whether to filter the reference sample may be determined based on the size of the current block. Further, the filtering method of the reference sample may be determined by a filtering flag delivered from the encoder.

The prediction sample generating unit 3303 generates the prediction sample of the current block by using the reference sample.

The prediction sample generating unit 3303 generates the prediction sample of the current block by using the reference sample neighboring to the current block according to the intra prediction mode of the current block.

The prediction sample filtering unit 3304 filters the sample adjacent to the top boundary and/or the left boundary of the current block among the prediction samples.

The prediction sample filtering unit 3304 may filter a prediction sample (i.e., prediction block boundary pixel) adjacent to the boundary of the current block using the methods described in FIGS. 5 to 31 above.

As described above, when the current block is the non-square block, the prediction sample filtering unit 3304 may determine whether to filter the sample adjacent to the top boundary of the current block by considering only the width of the current block and determine whether to filter the sample adjacent to the left boundary of the current block by considering only the height of the current block.

For example, when the intra prediction mode of the current block is the DC mode, the prediction sample filtering unit 3304 may perform filtering of the sample adjacent to the top boundary of the current block when the width of the current block is equal to or less tan a predefined size and perform filtering of the sample adjacent to the left boundary of the current block when the height of the current block is equal to or less than a predefined size.

Further, when the directionality of the intra prediction mode of the current block belongs to a predefined range based on the horizontal intra prediction mode, the prediction sample filtering unit 3304 may perform filtering of the sample adjacent to the top boundary of the current block when the height of the current block is equal to or less than the predefined size.

Further, when the directionality of the intra prediction mode of the current block belongs to a predefined range based on the vertical intra prediction mode, the prediction sample filtering unit 3304 may perform filtering of the sample adjacent to the left boundary of the current block when the width of the current block is equal to or less than the predefined size.

Further, in the intra prediction mode method in which a total of 67 intra prediction modes are defined, when the intra prediction mode of the current block is mode #2, the prediction sample filtering unit 3304 may perform filtering of the sample adjacent to the top boundary of the current block when the width of the current block is equal to or less than the predefined size. In this case, when the height of the current block is more than 4, the prediction sample filtering unit 3304 may filter samples which belong to four lines adjacent to the top boundary of the current block. On the contrary, when the height of the current block is not more than 4, the prediction sample filtering unit 3304 may filter samples which belong to two lines adjacent to the top boundary of the current block.

Further, in the intra prediction mode method in which a total of 67 intra prediction modes are defined, when the intra prediction mode of the current block is mode #66, the prediction sample filtering unit 3304 may perform filtering of the sample adjacent to the left boundary of the current block when the height of the current block is equal to or less than the predefined size. In this case, when the height of the current block is more than 4, the prediction sample filtering unit 3304 may filter samples which belong to four lines adjacent to the left boundary of the current block. On the contrary, when the width of the current block is not more than 4, the prediction sample filtering unit 3304 may filter only samples which belong to two lines adjacent to the left boundary of the current block.

Embodiments described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious that claims that are not explicitly cited in each other in the appended claims may be presented in combination as an exemplary embodiment of the present invention or included as a new claim by a subsequent amendment after the application is filed.

The embodiments of the present invention may be achieved by various means, for example, hardware, firmware, software, or a combination thereof. In a hardware configuration, the methods according to the embodiments of the present invention may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the embodiments of the present invention may be implemented in the form of a module, a procedure, a function, etc. Software code may be stored in a memory unit and executed by a processor. The memory unit may be located at the interior or exterior of the processor and may transmit data to and receive data from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The above-described preferred embodiments of the present invention are illustrative only and are not intended to represent all aspects of the invention, and those skilled in the art should understood that the invention is to cover all modifications, equivalents, and alternatives falling within the spirit and scope of the invention.

The invention claimed is:

1. A method for decoding a video signal by an apparatus, comprising:
   deriving an intra prediction mode of a current block;
   configuring reference samples based on blocks neighboring to the current block;
   performing an intra prediction for the current block based on the reference samples and the intra prediction mode to obtain prediction samples of the current block;
   filtering the prediction samples of the current block; and
   obtaining reconstructed samples for the current block based on the prediction samples and residual samples of the current block,
   wherein the filtering the prediction samples comprises:
   filtering the prediction samples based on the intra prediction mode and further based on only a width among the width and a height of the current block, when the intra prediction mode is one between mode 2 and mode 10 in an intra prediction method in which mode 0 to mode 66 are defined; and
   filtering the prediction samples based on the intra prediction mode and further based on only the height among the width and the height of the current block, when the intra prediction mode is one between mode 59 and mode 66 in the intra prediction method.

2. The method of claim 1, wherein the reference samples are configured based on samples neighboring to an upper side and samples neighboring to a left side of the current block.

3. The method of claim 1, wherein when the intra prediction mode of the current block is a DC mode, the filtering of the prediction samples adjacent to an upper boundary of the current block is performed based on that the width of the current block is equal to or less than a predetermined size, and the filtering of the prediction samples adjacent to a left boundary of the current block is performed based on that the height of the current block is equal to or less than a predetermined size.

4. The method of claim 1, wherein when a directionality of the intra prediction mode of the current block is within a predetermined range based on a horizontal intra prediction mode, the filtering of the prediction samples adjacent to an upper boundary of the current block is performed based on that the width of the current block is equal to or less than a predetermined size.

5. The method of claim 1, wherein when a directionality of the intra prediction mode of the current block is within a predetermined range based on a vertical intra prediction mode, the filtering of the prediction samples adjacent to a left boundary of the current block is performed based on the height of the current block is equal to or less than a predetermined size.

6. A method of encoding an image by an apparatus, comprising:
   determining an intra prediction mode of a current block;
   configuring reference samples based on blocks neighboring to the current block;
   performing an intra prediction for the current block based on the reference samples and the intra prediction mode to obtain prediction samples of the current block;
   filtering the prediction samples of the current block; and
   obtaining residual samples for the current block based on the prediction samples and original samples of the current block,
   wherein the filtering the prediction samples comprises:
   filtering the prediction samples based on the intra prediction mode and further based on only a width among the width and a height of the current block, when the intra prediction mode is one between mode 2 and mode 10 in an intra prediction method in which mode 0 to mode 66 are defined; and
   filtering the prediction samples based on the intra prediction mode and further based on only the height among the width and the height of the current block, when the intra prediction mode is one between mode 59 and mode 66 in the intra prediction method.

7. The method of claim 6, wherein the reference samples are configured based on samples neighboring to an upper side and samples neighboring to a left side of the current block.

8. The method of claim 6, wherein when the intra prediction mode of the current block is a DC mode, the filtering of the prediction samples adjacent to an upper boundary of the current block is performed based on that the width of the current block is equal to or less than a predetermined size, and the filtering of the prediction samples adjacent to a left boundary of the current block is performed based on that the height of the current block is equal to or less than a predetermined size.

9. The method of claim 6, wherein when a directionality of the intra prediction mode of the current block is within a predetermined range based on a horizontal intra prediction mode, the filtering of the prediction samples adjacent to an upper boundary of the current block is performed based on that the width of the current block is equal to or less than a predetermined size.

10. The method of claim 6, wherein when a directionality of the intra prediction mode of the current block is within a predetermined range based on a vertical intra prediction mode, the filtering of the prediction samples adjacent to a left boundary of the current block is performed based on the height of the current block is equal to or less than a predetermined size.

11. A non-transitory decoder-readable storage medium for storing encoded picture information generated by performing the steps of:
   determining an intra prediction mode of a current block;
   configuring reference samples based on blocks neighboring to the current block;
   performing an intra prediction for the current block based on the reference samples and the intra prediction mode to obtain prediction samples of the current block;
   filtering the prediction samples of the current block; and
   obtaining residual samples for the current block based on the prediction samples and original samples of the current block,
   wherein the filtering the prediction samples comprises:
   filtering the prediction samples based on the intra prediction mode and further based on only a width among the width and a height of the current block, when the intra prediction mode is one between mode 2 and mode 10 in an intra prediction method in which mode 0 to mode 66 are defined; and
   filtering the prediction samples based on the intra prediction mode and further based on only the height among the width and the height of the current block, when the intra prediction mode is one between mode 59 and mode 66 in the intra prediction method.

* * * * *